US012646821B2

(12) United States Patent
Kim et al.

(10) Patent No.: US 12,646,821 B2
(45) Date of Patent: Jun. 2, 2026

(54) ELECTRONIC DEVICE COMPRISING ANTENNA STRUCTURE, USING MOVABLE HOUSING

(71) Applicant: Samsung Electronics Co., Ltd., Suwon-si (KR)

(72) Inventors: Jiho Kim, Suwon-si (KR); Yoonjung Kim, Suwon-si (KR); Kyungmoon Seol, Suwon-si (KR); Seongyong An, Suwon-si (KR); Minkyung Lee, Suwon-si (KR); Kyihyun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 18/897,761

(22) Filed: Sep. 26, 2024

(65) Prior Publication Data

US 2025/0023225 A1 Jan. 16, 2025

Related U.S. Application Data

(63) Continuation of application No. PCT/KR2023/003968, filed on Mar. 24, 2023.

(30) Foreign Application Priority Data

Mar. 28, 2022 (KR) ........................ 10-2022-0038320
May 4, 2022 (KR) ........................ 10-2022-0055777

(51) Int. Cl.
*H01Q 1/22* (2006.01)
*H01Q 1/24* (2006.01)

(52) U.S. Cl.
CPC .......... *H01Q 1/2266* (2013.01); *H01Q 1/243* (2013.01)

(58) Field of Classification Search
CPC ............................ H01Q 1/2266; H01Q 1/243
See application file for complete search history.

(56) References Cited

U.S. PATENT DOCUMENTS 9,583,838 B2 2/2017 Zhu et al.
10,347,966 B2 7/2019 Lee et al.
(Continued)

FOREIGN PATENT DOCUMENTS

KR 10-2018-0060163 A 6/2018
KR 10-2021-0058732 A 5/2021
(Continued)

OTHER PUBLICATIONS

International Search Report and Written Opinion dated Jul. 5, 2023, issued in International Patent Application No. PCT/KR2023/003968.

(Continued)

*Primary Examiner* — Graham P Smith
(74) *Attorney, Agent, or Firm* — Jefferson IP Law, LLP

(57) ABSTRACT

An electronic device is provided. The electronic device includes a first housing including a first plate including an opening and a slit formed along a surface of the first plate from a periphery of the opening, a second housing including a second plate spaced apart from the first plate and at least partially overlapping the opening, and coupled to the first housing to be movable along a first direction or a second direction that is opposite to the first direction with respect to the first housing, a wireless communication circuit electrically connected to the second plate, and a first printed circuit board electrically connected to the wireless communication circuit and extending along a periphery of the opening formed in the first plate to feed through an end connected to the slit, wherein the wireless communication circuit is configured to communicate with an external electronic (Continued)

device in a designated frequency band through the first plate and the second plate.

20 Claims, 30 Drawing Sheets

(56) References Cited

U.S. PATENT DOCUMENTS

| | | | |
|---|---|---|---|
| 10,883,534 | B2 | 1/2021 | Bae et al. |
| 11,031,701 | B2 | 6/2021 | Li et al. |
| 11,228,093 | B2 | 1/2022 | Won et al. |
| 2018/0151943 | A1 | 5/2018 | Lee et al. |
| 2021/0159585 | A1 | 5/2021 | Choi et al. |
| 2021/0219437 | A1 | 7/2021 | Kim et al. |
| 2021/0336329 | A1 | 10/2021 | Kim |
| 2022/0019261 | A1 | 1/2022 | Kang et al. |
| 2022/0094040 | A1 | 3/2022 | Choi et al. |
| 2022/0166862 | A1 | 5/2022 | Lee et al. |
| 2023/0152865 | A1 | 5/2023 | Park et al. |
| 2023/0208013 | A1 | 6/2023 | Lee et al. |

FOREIGN PATENT DOCUMENTS

| | | | |
|---|---|---|---|
| KR | 10-2295237 | B1 | 8/2021 |
| KR | 10-2021-0158205 | A | 12/2021 |
| KR | 10-2022-0008724 | A | 1/2022 |
| KR | 10-2022-0012039 | A | 2/2022 |
| KR | 10-2022-0030803 | A | 3/2022 |
| KR | 10-2573516 | B1 | 9/2023 |
| WO | 2021/100939 | A1 | 5/2021 |
| WO | 2021/246730 | A1 | 12/2021 |
| WO | 2022/019685 | A1 | 1/2022 |

OTHER PUBLICATIONS

Extended European Search Report dated Jun. 2, 2025, issued in European Patent Application No. 23781257.3.

Indian Office Action dated Mar. 24, 2026, issued in Indian Application No. 202417072733.

ELECTRONIC DEVICE COMPRISING ANTENNA STRUCTURE, USING MOVABLE HOUSING

CROSS-REFERENCE TO RELATED APPLICATION(S)

This application is a continuation application, claiming priority under § 365(c), of an International application No. PCT/KR2023/003968, filed on Mar. 24, 2023, which is based on and claims the benefit of a Korean patent application number 10-2022-0038320, filed on Mar. 28, 2022, in the Korean Intellectual Property Office, and of a Korean patent application number 10-2022-0055777, filed on May 4, 2022, in the Korean Intellectual Property Office, the disclosure of each of which is incorporated by reference herein in its entirety.

BACKGROUND

1. Field

The disclosure relates to an electronic device including an antenna structure using a movable housing.

2. Description of Related Art

An electronic device may communicate with an external electronic device using an antenna for wireless communication. The electronic device, such as a smart phone, a tablet, or a notebook computer may include a plurality of antennas for various types of communication with an external electronic device. The electronic device may provide a structure that increases space efficiency for a disposition of the plurality of antennas.

The above information is presented as background information only to assist with an understanding of the disclosure. No determination has been made, and no assertion is made, as to whether any of the above might be applicable as prior art with regard to the disclosure.

SUMMARY

In order to achieve portability and usability of electronic devices, a flexible device capable of providing a large-screen display being developed. The flexible device may include a structure for providing a state change of the electronic device. Since the structure for providing a state change of the electronic device is included, a mounting space in which an antenna is to be disposed inside the electronic device may be insufficient.

Aspects of the disclosure are to address at least the above-mentioned problems and/or disadvantages and to provide at least the advantages described below. Accordingly, an aspect of the disclosure is to provide a structure including an antenna structure using a portion of a housing of an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a first housing including a first plate including an opening and a slit formed along a surface of the first plate from a periphery of the opening, a second housing including a second plate spaced apart from the first plate and at least partially overlapping the opening, and coupled to the first housing to be movable along a first direction or a second direction opposite to the first direction with respect to the first housing, a wireless communication circuit electrically connected to the second plate, and a first printed circuit board electrically connected to the wireless communication circuit and extending along a periphery of the opening formed in the first plate to feed through an end connected to the slit, wherein the wireless communication circuit is configured to communicate with an external electronic device in a designated frequency band through the first plate and the second plate.

In accordance with another aspect of the disclosure, an electronic device is provided. The electronic device includes a first housing including a first plate including an opening, a second housing coupled to the first housing to be moveable in a first direction or a second direction opposite to the first direction with respect to the first housing, the second housing including a second plate spaced apart from the first plate, at least partially overlapping the opening, and a slit formed along a surface of the second plate from a position corresponding to a periphery of the opening, a wireless communication circuit operatively connected to the first plate, and a printed circuit board including an extension electrically connected to the wireless communication circuit and feeding through an end connected to the slit, wherein the wireless communication circuit communicates with an external electronic device in a designated frequency band through the first plate and the second plate.

An electronic device according to an embodiment can utilize a first plate and a second plate formed of a metal included in a first housing and a second housing as an antenna radiator.

According to an embodiment of the disclosure, segmentation can be reduced by using an internal plate as an antenna radiator without using a side surface of a housing as a segment antenna, thereby improving aesthetic.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
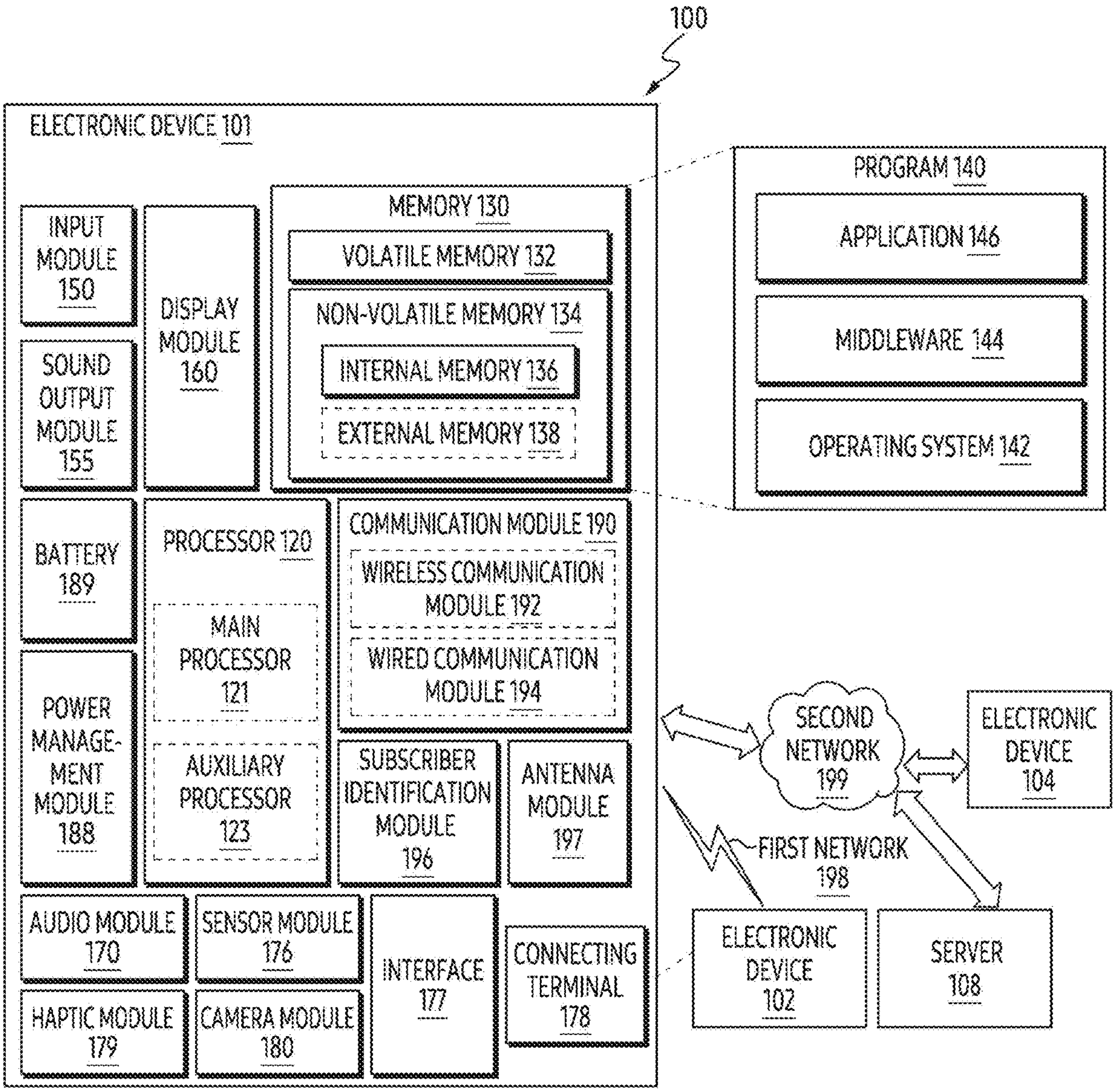
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
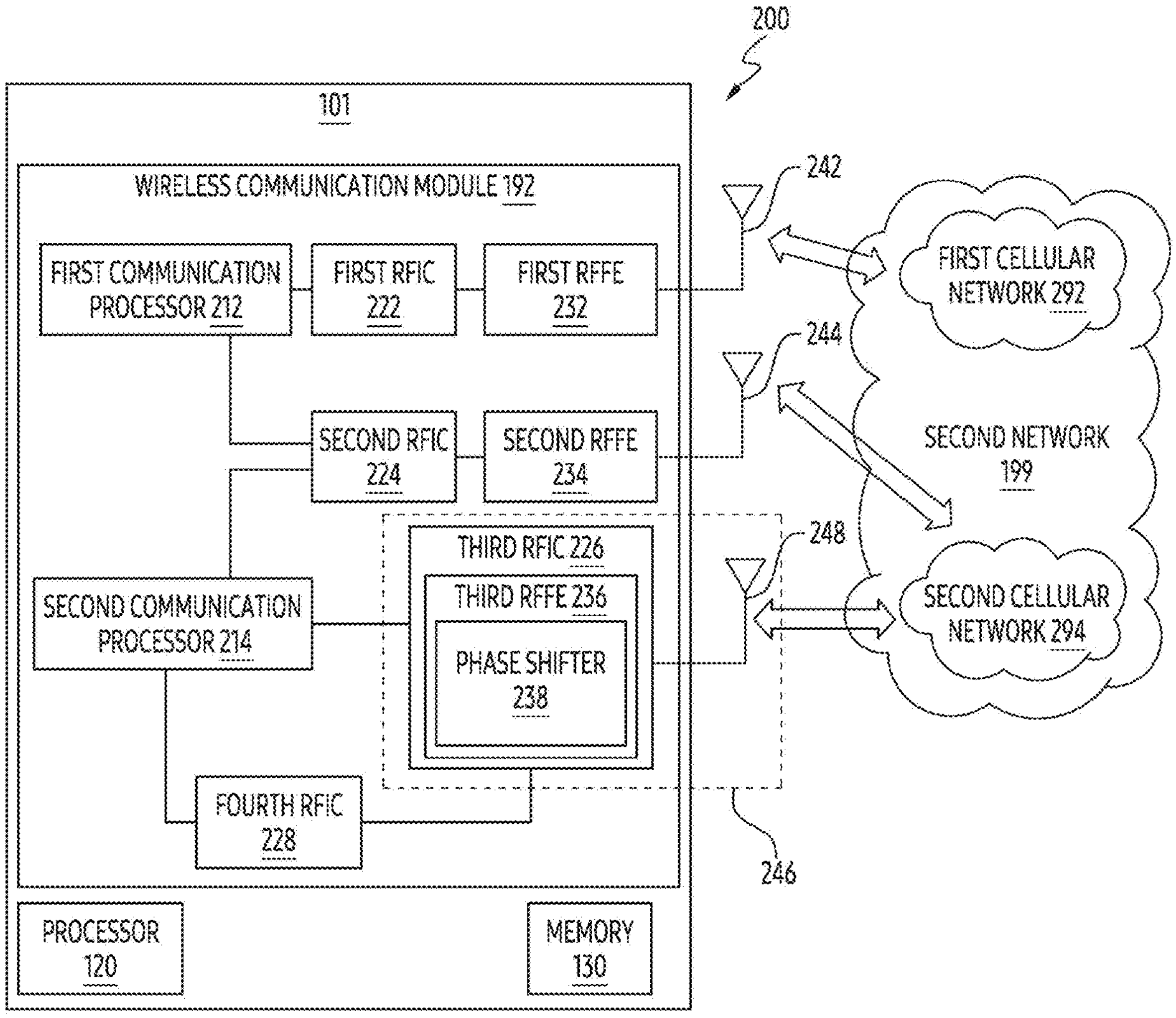
FIG. 2 is a block diagram of an electronic device for supporting legacy network communication and fifth generation (5G) network communication, according to an embodiment of the disclosure.

FIG. 2 is a block diagram 200 of an electronic device for supporting legacy network communication and 5G network communication according to an embodiment of the disclosure.

Referring to FIG. 2, the electronic device 101 may include a first communication processor 212, a second communication processor 214, a first radio frequency integrated circuit (RFIC) 222, a second RFIC 224, and a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment of the disclosure, the electronic device 101 may further include at least one of the components illustrated in FIG. 1, and the second network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may constitute at least a part of a wireless communication module 192. According to another embodiment of the disclosure, the fourth RFIC 228 may be omitted or may be included as a part of the third RFIC 226.

The first communication processor 212 may support the establishment of a communication channel of a band to be used for wireless communication with the first cellular network 292 and legacy network communication through the established communication channel. According to various embodiments of the disclosure, the first cellular network 292 may be a legacy network including a $2^{nd}$ generation (2G), $3^{rd}$ generation (3G), $4^{th}$ generation (4G), and/or long-term evolution (LTE) network. The second communication processor 214 may support the establishment of a communication channel corresponding to a specified band (e.g., approximately 6 GHz to 60 GHz) among bands to be used for wireless communication with the second cellular network 294, and 5G network communication through the established communication channel. According to various embodiments of the disclosure, the second cellular network 294 may be a 5G network defined by 3GPP. Additionally, according to an embodiment of the disclosure, the first communication processor 212 or the second communication processor 214 may support the establishment of a communication channel corresponding to another specified band (e.g., approximately 6 GHz or less) among bands to be used for wireless communication with the second cellular network 294, and 5G network communication through the established communication channel. According to an embodiment of the disclosure, the first communication processor 212 and the second communication processor 214 may be implemented in a single chip or a single package. According to various embodiments of the disclosure, the first communication processor 212 or the second communication processor 214 may be formed with the processor 120, the auxiliary processor 123 of FIG. 1, or the communication module 190 in a single chip or a single package.

Upon transmission, the first RFIC 222 may convert a baseband signal generated by the first communication processor 212 into a radio frequency (RF) signal of approximately 700 MHz to approximately 3 GHz used in the first cellular network 292 (e.g., a legacy network). Upon reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding one of the first communication processor 212 or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately 60 GHZ) to be used in the second cellular network 294 (e.g., the 5G network). Upon reception, a 5G Above6 RF signal may be obtained from the second cellular network 294 (e.g., the 5G network) through an antenna (e.g., the antenna 248), and may be preprocessed through the third RFFE 236. For example, the third RFFE 236 may perform preprocessing of the signal by using a phase shifter 238. The third RFIC 226 may convert the preprocessed 5G Above6 RF signal into a baseband signal so as to be processed by the second communication processor 214. According to an embodiment of the disclosure, the third RFFE 236 may be formed as a part of the third RFIC 226.

According to an embodiment of the disclosure, the electronic device 101 may include the fourth RFIC 228 separately from or at least as a part of the third RFIC 226. In this case, the fourth RFIC 228 may convert the baseband signal generated by the second communication processor 214 into an RF signal (hereinafter, referred to as an intermediate frequency (IF) signal) of an intermediate frequency band (e.g., approximately 9 GHz to approximately 11 GHz), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an embodiment of the disclosure, the first RFIC 222 and the second RFIC 224 may be implemented as a single chip or at least a part of a single package. According to an embodiment of the disclosure, the first RFFE 232 and the second RFFE 234 may be implemented as a single chip or at least a part of a single package. According to an embodiment of the disclosure, at least one of the first antenna module 242 or the second antenna module 244 may be omitted or combined with another antenna module to process RF signals of a plurality of corresponding bands.

According to an embodiment of the disclosure, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., the lower surface) of a second substrate (e.g., a sub PCB) separate from the first substrate, and the antenna 248 may be disposed in another partial region (e.g., the upper surface) to form the third antenna module 246. According to an embodiment of the disclosure, the antenna 248 may include, for example, an antenna array that may be used for beamforming. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHz) used for 5G network communication by the transmission line. Accordingly, the electronic device 101 may improve the quality or speed of communication with the second cellular network 294 (e.g., the 5G network).

The second cellular network 294 (e.g., the 5G network) may be operated independently of (e.g., Stand-Alone (SA)) or operated to be connected to (e.g., non-stand alone (NSA)) the first cellular network 292 (e.g., the legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., new radio (NR) protocol information) may be stored in the memory 230 and may be accessed by other components (e.g., the processor 120, the first communication processor 212, or the second communication processor 214).

Figure 3A:
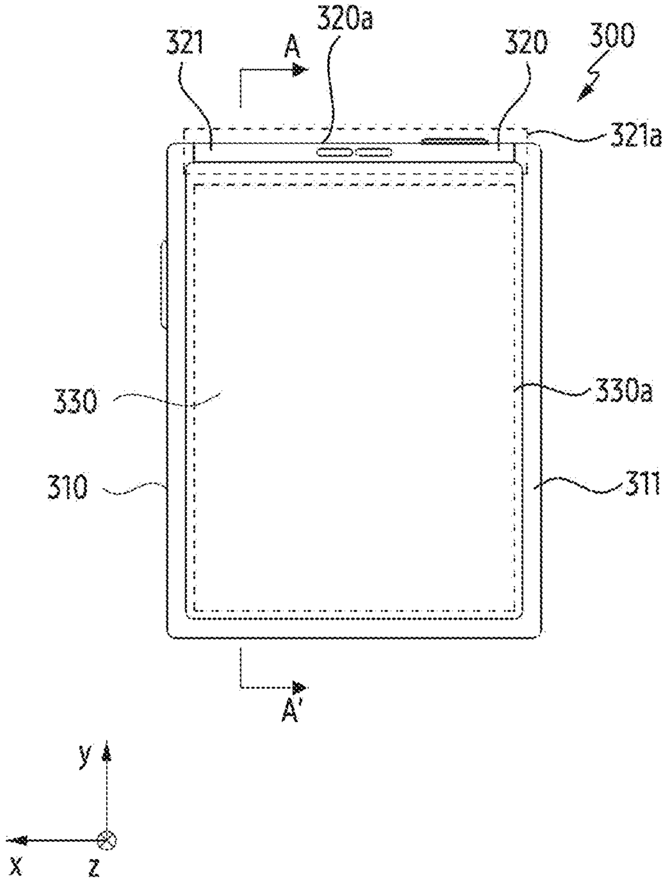
FIG. 3A is a front view of a first state of an electronic device according to an embodiment of the disclosure.
Figure 3B:
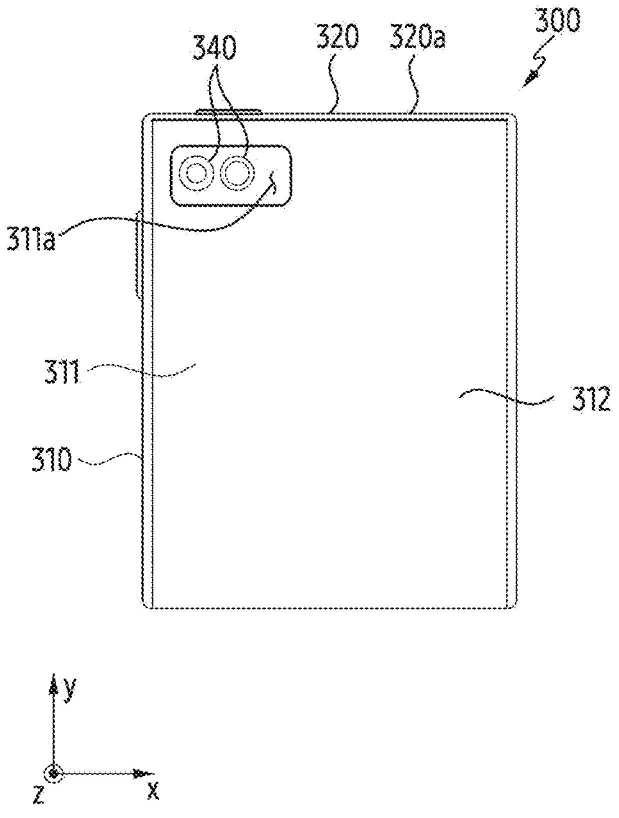
FIG. 3B is a rear view of a first state of an electronic device according to an embodiment of the disclosure.
Figure 3C:
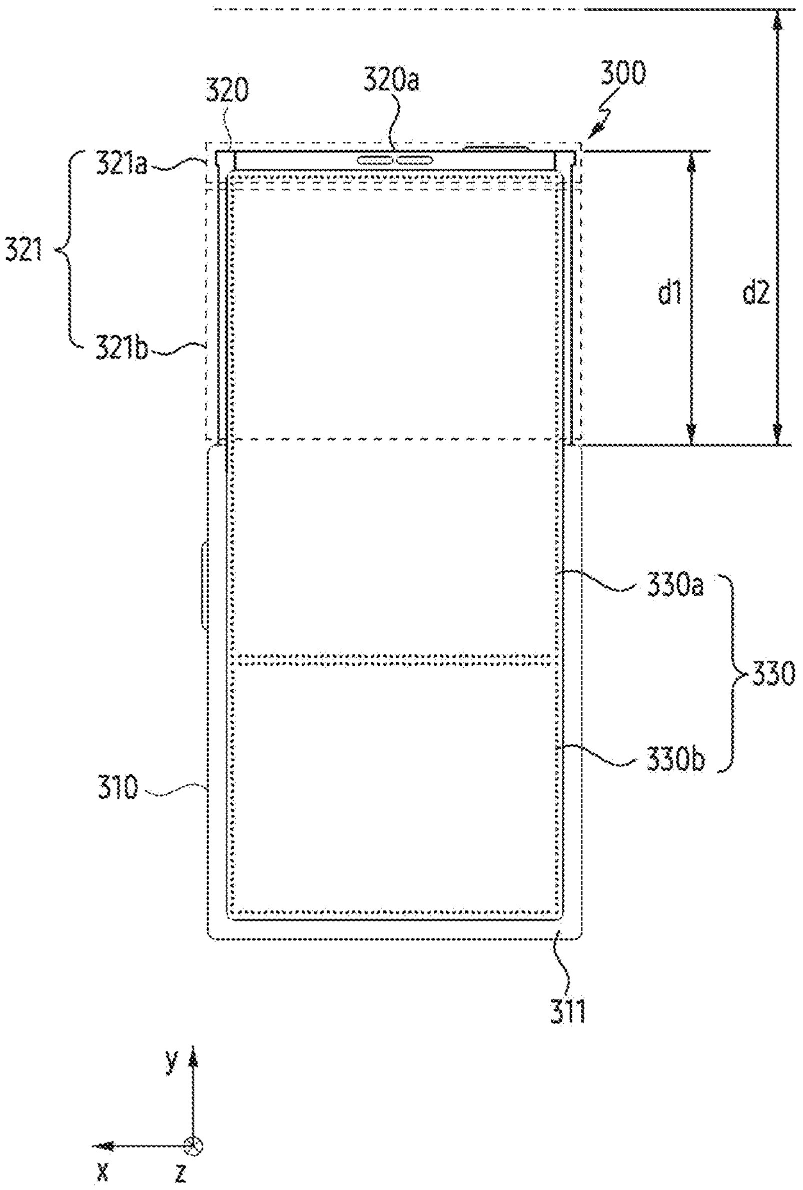
FIG. 3C is a front view of a second state of an electronic device according to an embodiment of the disclosure.
Figure 3D:
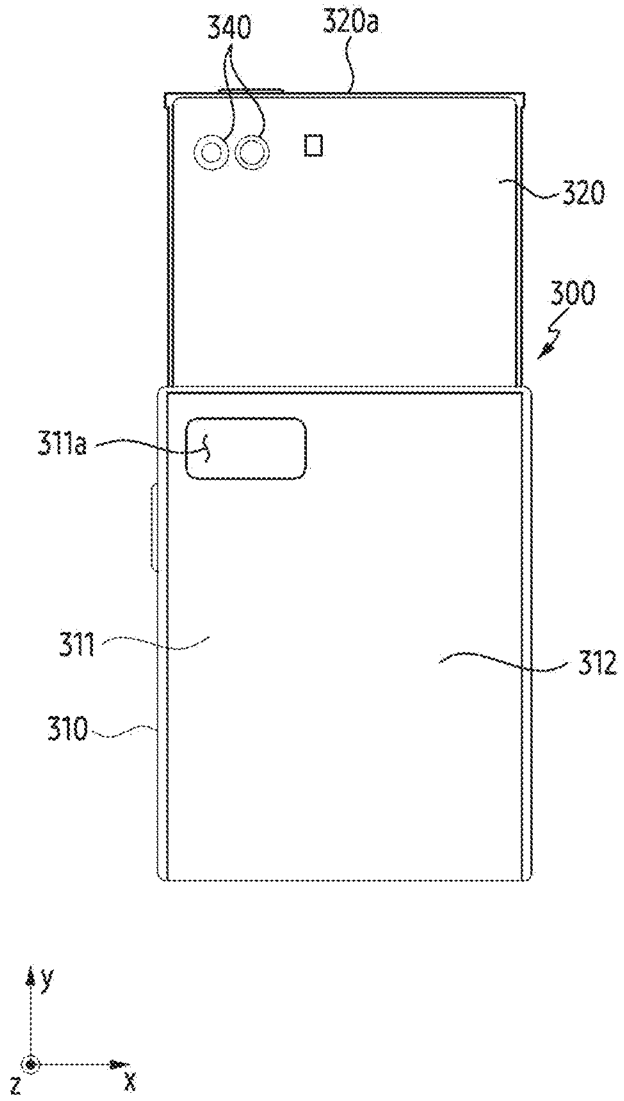
FIG. 3D is a rear view of a second state of an electronic device according to an embodiment of the disclosure.

FIG. 3A is a front view of a first state of an electronic device according to an embodiment of the disclosure, FIG. 3B is a rear view of a first state of an electronic device according to an embodiment of the disclosure, FIG. 3C is a front view of a second state of an electronic device according to an embodiment of the disclosure, and FIG. 3D is a rear view of a second state of an electronic device according to an embodiment of the disclosure.

Referring to FIGS. 3A, 3B, 3C, and 3D, an electronic device 300 (e.g., the electronic device 101 of FIG. 1) according to an embodiment may include a first housing 310, a second housing 320, a display 330 (e.g., the display module 160 of FIG. 1), and a camera 340 (e.g., the camera module 180 of FIG. 1). According to an embodiment of the disclosure, the second housing 320 may be slidable with respect to the first housing 310. For example, the second housing 320 may move within a range of a designated distance with respect to the first housing 310 along a first direction (e.g., +y direction). When the second housing 320 moves in the first direction, a distance between a side surface 320*a* of the second housing 320 facing the first direction and the first housing 310 may increase. For another example, the second housing 320 may move within a range of a designated distance with respect to the first housing 310 along a second direction (e.g., −y direction) opposite to the first direction. When the second housing 320 moves in the second direction, a distance between the side surface 320*a* of the second housing 320 facing the first direction and the first housing 310 may decrease. According to an embodiment of the disclosure, the second housing 320 may linearly reciprocate with respect to the first housing 310 by sliding relatively with respect to the first housing 310. For example, at least a portion of the second housing 320 may be inserted into the first housing 310 or may be extracted from the first housing 310.

According to an embodiment of the disclosure, the electronic device 300 may be referred to as a "slidable electronic device" as the second housing 320 is designed to be slidable with respect to the first housing 310. According to an embodiment of the disclosure, the electronic device 300 may be referred to as a "rollable electronic device" as at least a portion of the display 330 is designed to be wound inside the second housing 320 (or the first housing 310) based on a slide movement of the second housing 320.

According to an embodiment of the disclosure, the first state of the electronic device 300 may be defined as a state in which the second housing 320 moves in a second direction (e.g., a contracted state or a slide-in state). For example, in the first state of the electronic device 300, it may not be substantially movable in the second direction. In the first state of the electronic device 300, a distance between the side surface 320*a* of the second housing 320 and the first housing 310 may not be reduced. For another example, in the first state of the electronic device 300, a portion of the second housing 320 may not be insertable. According to an embodiment of the disclosure, the first state of the electronic device 300 may be a state in which a second area 330*b* of the display 330 is not visually exposed outside the electronic device 300. For example, in the first state of the electronic device 300, the second area 330*b* of the display 330 may be located inside an inner space (not illustrated) of the electronic device 300 formed by the first housing 310 and/or the second housing 320, and may not be visible outside the electronic device 300.

According to an embodiment of the disclosure, the second state of the electronic device 300 may be defined as a state in which the second housing 320 moves in a first direction (e.g., a extraction state or a slide-out state). For example, in the second state of the electronic device 300, the second housing 320 may not be substantially movable in the first direction. In the second state of the electronic device 300, a distance between the side surface 320*a* of the second housing 320 and the first housing 310 may not increase. For another example, in the second state of the electronic device 300, a portion of the second housing 320 may not be extractable from the first housing 310. According to an embodiment of the disclosure, the second state of the electronic device 300 may be a state in which the second area 330*b* of the display 330 is visually exposed to the outside of the electronic device 300. For example, in the second state of the electronic device 300, the second area 330*b* of the display 330 may be extracted from the inner space of the electronic device 300, and be visible outside the electronic device 300.

According to an embodiment of the disclosure, when the second housing 320 moves from the first housing 310 in the first direction, at least a portion of the second housing 320 and/or the second area 330*b* of the display 330 may be extracted from the first housing 310 by an extraction length d1 corresponding to a moving distance of the second housing 320. According to an embodiment of the disclosure, the second housing 320 may reciprocate within a designated distance d2. According to an embodiment of the disclosure, the extraction length d1 may have a size of about 0 to a designated distance d2.

According to an embodiment of the disclosure, a state of the electronic device 300 may be convertible between the second state and/or the first state, by a manual operation by a user or an automatic operation by a driving module (not illustrated) disposed inside the first housing 310 or the second housing 320. According to an embodiment of the disclosure, an operation of the driving module may be triggered based on a user input. According to an embodiment of the disclosure, the user input for triggering the operation of the driving module may include a touch input, a force touch input, and/or a gesture input through the display 330. According to another embodiment of the disclosure, the user input for triggering the operation of the driving module may include a sound input (voice input) or an input of a physical button exposed to the outside of the first housing 310 or the second housing 320. According to an embodiment of the disclosure, the driving module may be driven in a semi-automatic manner in which an operation is triggered when a manual operation by an external force of a user is detected.

According to an embodiment of the disclosure, the first state of the electronic device 300 may be referred to as a first shape, and the second state of the electronic device 300 may be referred to as a second shape. For example, the first shape may include a normal state, a reduced state, or a closed state, and the second shape may include an opened state. According to an embodiment of the disclosure, the electronic device 300 may form a third state (e.g., an intermediate state), which is a state between the first state and the second state. For example, the third state may be referred to as a third shape, and the third shape may include a free-stop state.

According to an embodiment of the disclosure, the display 330 may be visible (or viewable) from the outside through a front direction (e.g., −z direction) of the electronic device 300 to display visual information to the user. For example, the display 330 may include a flexible display. According to an embodiment of the disclosure, at least a portion of the display 330 may be disposed in the second housing 320, and may be extracted from an inner space (not illustrated) of the electronic device 300 or inserted into the inner space of the electronic device 300 according to the movement of the second housing 320. The inner space of the electronic device 300 may mean a space within the first housing 310 and the second housing 320 formed by coupling of the first housing 310 and the second housing 320. For example, in the first state of the electronic device 300, at least a portion of the display 330 may inserted by being rolled into the inner space of the electronic device 300. When the second housing 320 moves in the first direction in a state that at least a portion of the display 330 is inserted into the inner space of the electronic device 300, at least a portion of the display 330 may be extracted from the inner space of the electronic device 300. For another example, when the second housing 320 moves in the second direction, at least a portion of the display 330 may be inserted into the inner space of the electronic device 300 by being rolled inside the electronic device 300. As at least a portion of the display 330 is extracted or inserted, an area of the display 330 visible outside the electronic device 300 may be expanded or contracted. According to an embodiment of the disclosure, the display 330 may include the first area 330*a* and/or the second area 330*b*.

According to an embodiment of the disclosure, the first area 330*a* of the display 330 may mean an area of the display 330 fixedly visible outside the electronic device 300, regardless of whether the electronic device 300 is in the second state or the first state. For example, the first area 330*a* may mean a partial area of the display 330 that is not rolled into the inner space of the electronic device 300. According to an embodiment of the disclosure, when the second housing 320 moves, the first area 330*a* may move together with the second housing 320. For example, when the second housing 320 moves along the first direction or the second direction, the first area 330*a* may move along the first direction or the second direction on the front of the electronic device 300, together with the second housing 320.

According to an embodiment of the disclosure, the second area 330*b* of the display 330 may be inserted into the inner space of the electronic device 300 or extracted from the inner space of the electronic device 300 according to the movement of the second housing 320. For example, at least a portion of the second area 330*b* of the display 330 may be a state of being inserted into the inner space of the electronic device 300 in a rolled state, in the first state of the electronic device 300. The second area 330*b* of the display 330 may be inserted into the inner space of the electronic device 300 in the first state of the electronic device 300, and may not be visible outside. For another example, the second area 330*b* of the display 330 may be a state extracted from the inner space of the electronic device 300, in the second state of the electronic device 300. The second area 330*b* of the display 330 may be visible to the outside of the electronic device 300 in the second state.

According to an embodiment of the disclosure, in the first state of the electronic device 300, an area of the display 330 visible from the outside of the electronic device 300 may include only the first area 330*a* of the display 330. The area of the display 330 visible from the outside of the electronic device 300 in the second state of the electronic device 300 may include at least a portion of the first area 330*a* and the second area 330*b* of the display 330.

According to an embodiment of the disclosure, the first housing 310 of the electronic device 300 may include a first support member 311 surrounding the inner space of the first housing 310, a rear plate 312 covering a rear surface of the first support member 311, and a first side member 314 covering at least a portion of a periphery of the first support member 311. According to an embodiment of the disclosure, the first support member 311 may be integrally formed with the first side member 314. The first support member 311 may be extended inside the electronic device 300 from at least a portion of a surface of the first side member 314 facing the inside of the electronic device 300. According to an embodiment of the disclosure, the first support member 311 and the first side member 314 may be integrally formed or formed of the same material.

According to an embodiment of the disclosure, the second housing 320 of the electronic device 300 may include a second support member 321 and a second side member 329 covering the inner space of the electronic device 300.

According to an embodiment of the disclosure, the second side member 329 may form at least a portion of a side surface of the second housing 320. The second support member 321 may support an electronic device (e.g., the camera 340 and/or the printed circuit board 324) disposed in the second housing 320. The second side member 329 may cover at least a portion of the second support member 321. According to an embodiment of the disclosure, the second support member 321 may be integrally formed with the second side member 329. The second support member 321 may be extended from at least a portion of a surface of the second side member 329 facing the inside of the second housing 320 inside the second housing 320. According to an embodiment of the disclosure, the second support member 321 and the second side member 329 may be integrally formed or formed of the same material.

According to an embodiment of the disclosure, the second support member 321 may include a first cover area 321*a* of the second support member 321 that is not inserted into the first housing 310 and a second cover area 321*b* that is inserted into or extracted from the first housing 310. The first cover area 321*a* of the second support member 321 may always be visible, regardless of whether the electronic device 300 is in the second state and the first state. According to an embodiment of the disclosure, at least a portion of the first cover area 321*a* of the second support member 321 may form the side surface 320*a* of the second housing 320. According to an embodiment of the disclosure, the second cover area 321*b* of the second housing 320 may not be visible in the first state, but may be visible in the second state.

The camera 340 may obtain an image of a subject, based on receiving light from the outside of the electronic device 300. According to an embodiment of the disclosure, the camera 340 may include one or more lenses, an image sensor, and/or an image signal processor. According to an embodiment of the disclosure, the camera 340 may be disposed on the second housing 320 to face a rear surface of the electronic device 300 opposite to the front surface of the electronic device 300 in which the first area 330*a* of the display 330 is disposed. For example, the camera 340 may be disposed on the second support member 321 of the second housing 320, and may be visible from the outside of the electronic device 300 through an opening 311*a* formed in the first support member 311 when the electronic device 300 is in the first state. For another example, the camera 340 may be disposed on the second support member 321 of the second housing 320 and when the electronic device 300 is in the first state, not be visible outside the electronic device 300 by being covered by the first support member 311 and/or the rear plate 312.

According to an embodiment of the disclosure, the camera 340 may include a plurality of cameras. For example, the camera 340 may include a wide-angle camera, an ultra-wide-angle camera, a telephoto camera, a proximity camera, and/or a depth camera. However, the camera 340 is not necessarily limited to including a plurality of cameras, and may include one camera.

According to an embodiment of the disclosure, the camera 340 may further include a camera (not illustrated) directing the front of the electronic device 300 in which the first area 330*a* of the display 330 is disposed. When the camera 340 faces the front of the electronic device 300, the camera 340 may be an under display camera (UDC) disposed below the display 330 (e.g., in the +z direction from the display 330), but is not limited thereto.

According to an embodiment of the disclosure, the electronic device 300 may include a sensor module (not illustrated) and/or a camera module (not illustrated) disposed below the display 330. The sensor module may detect an external environment based on information (e.g., light) received by penetrating the display 330. According to an embodiment of the disclosure, the sensor module may include at least one of a receiver, a proximity sensor, an ultrasonic sensor, a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, a motor encoder, or an indicator. According to an embodiment of the disclosure, at least some sensor module of the electronic device 300 may be visually exposed to the outside through a partial area of the display 330. According to an embodiment of the disclosure, the electronic device 300 may detect an extraction length (e.g., a length d1) using a sensor module. According to an embodiment of the disclosure, the electronic device 300 may generate extraction information on a degree of extraction detected by the sensor. For example, the electronic device 300 may detect and/or check the degree of extraction of the second housing 320 using extraction information. According to an embodiment of the disclosure, the extraction information may include information on the extraction length of the second housing 320.

According to an embodiment of the disclosure, a coupling form of the first housing 310 and the second housing 320 is not limited to the shape and coupling illustrated in FIGS. 3A, 3B, 3C, and 3D, and may be implemented by a combination and/or coupling of other shapes or components.

Figure 4A:
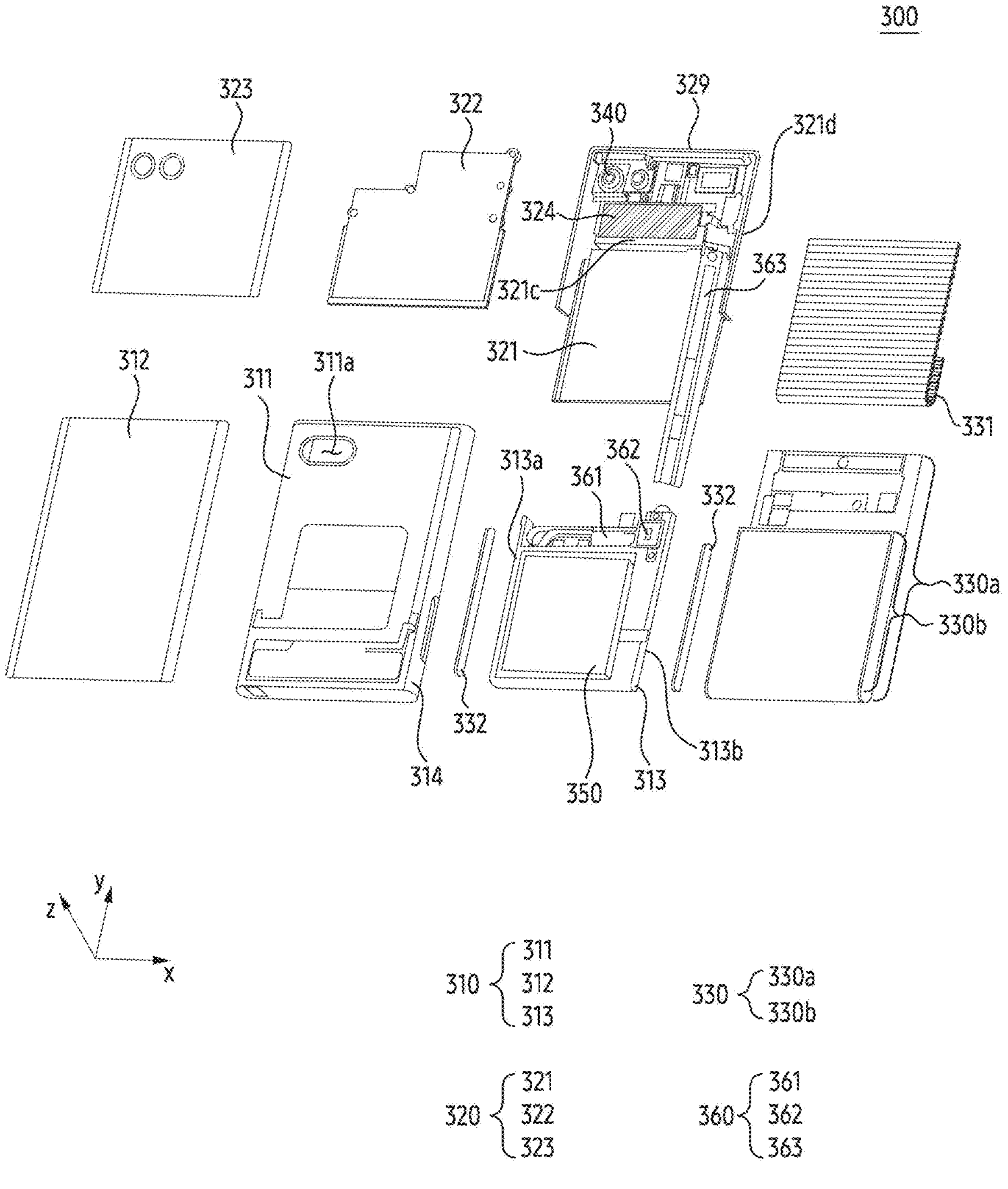
FIG. 4A is an exploded perspective view of an electronic device according to an embodiment of the disclosure.
Figure 4B:
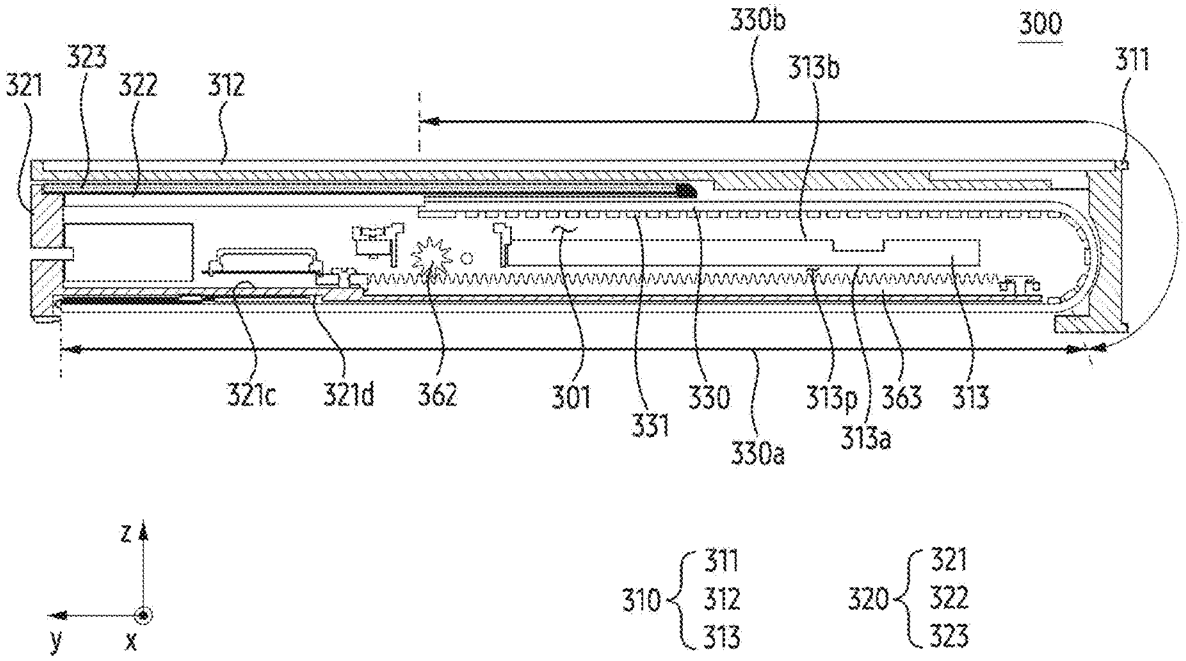
FIG. 4B is a cross-sectional view illustrating an electronic device cut along line A-A' of FIG. 3A according to an embodiment of the disclosure.

FIG. 4A is an exploded perspective view of an electronic device according to an embodiment of the disclosure, and FIG. 4B is a cross-sectional view illustrating an example of an electronic device cut along line A-A' of FIG. 3A according to an embodiment of the disclosure.

Referring to FIGS. 4A and 4B, an electronic device 300 according to an embodiment of the disclosure may include a first housing 310, a second housing 320, a display 330, a camera 340, a battery 350 (e.g., the battery 189 of FIG. 1) and/or a driving unit 360. According to an embodiment of the disclosure, the first housing 310 and the second housing 320 may be coupled to each other to form an inner space 301 of the electronic device 300. For example, in a first state of the electronic device 300, a second area 330*b* of the display 330 may be accommodated in the inner space 301.

According to an embodiment of the disclosure, the first housing 310 may include a first support member 311, a rear plate 312, and/or a third support member 313. According to an embodiment of the disclosure, the first support member 311, the rear plate 312, and the third support member 313 included in the first housing 310 may be coupled with each other and may not move when the second housing 320 moves with respect to the first housing 310. According to an embodiment of the disclosure, the first support member 311 may form at least a portion of an outer surface of the electronic device 300. For example, the first support member 311 may form at least a portion of a side surface of the electronic device 300 and may form at least a portion of a rear surface of the electronic device 300. According to an embodiment of the disclosure, the first support member 311 may provide a surface on which the rear plate 312 is mounted. The rear plate 312 may be mounted on a surface of the first support member 311.

According to an embodiment of the disclosure, the third support member 313 may support internal components of the electronic device 300. For example, the third support member 313 may accommodate the battery 350 and a motor 361 of the driving unit 360. The battery 350 and the motor 361 may be accommodated in at least one of a recess or a hole included in the third support member 313. According to an embodiment of the disclosure, the third support member 313 may be surrounded by the first support member 311. For example, in a first state of the electronic device 300, a surface 313*a* of the third support member 313 on which the battery 350 is disposed may face the first support member 311 and/or the second area 330*b* of the display 330. For another example, in the first state of the electronic device 300, another surface 313*b* of the third support member 313 facing a direction opposite to the surface 313*a* of the third support member 313 may face the first area 330*a* of the display 330 or the second support member 321. For example, the third support member 313 may include aluminum as a material, but is not limited thereto.

According to an embodiment of the disclosure, the second housing 320 may include a second support member 321, a rear cover 322, and/or a slide cover 323. According to an embodiment of the disclosure, the second support member 321, the rear cover 322, and the slide cover 323 may be coupled with each other, and may move together with the second housing 320 when the second housing 320 moves relative to the first housing 310. The second support member 321 may support internal components of the electronic device 300. For example, the printed circuit board 324 and/or the camera 340 on which electronic components (e.g., the processor 120 of FIG. 1) of the electronic device 300 are disposed may be disposed on a surface 321*c* of the second support member 321 facing the inner space 301. Another surface 321*d* of the second support member 321 facing a direction opposite to the surface 321*c* of the second support member 321 may face the first area 330*a* of the display 330 when the electronic device 300 is in the first state. According to an embodiment of the disclosure, the rear cover 322 may be coupled to the second support member 321 to protect components of the electronic device 300 disposed on the second support member 321. For example, the rear cover 322 may cover a portion of the surface 321*c* of the second support member 321. According to an embodiment of the disclosure, the slide cover 323 may be disposed on the rear cover 322 to form an outer surface of the electronic device 300 together with the rear plate 312 and the first support member 311. The slide cover 323 may be coupled to a surface of the rear cover 322 or the second support member 321 to protect the rear cover 322 and/or the second support member 321.

According to an embodiment of the disclosure, when the electronic device 300 is in the first state, the display 330 may be bent by being rolled into the inner space 301 at least partially. According to an embodiment of the disclosure, the display 330 may cover at least a portion of the third support member 313 and at least a portion of the second support member 321. For example, when the electronic device 300 is in the first state, the display 330 may cover the other surface 321*d* of the second support member 321, pass between the second support member 321 and the first support member 311, and extend toward the inner space 301. At least a portion of the display 330 may surround at least a portion of the third support member 313 after passing between the second support member 321 and the first support member 311. The display 330 may cover the surface 313*a* of the third support member 313 within the inner space 301. According to an embodiment of the disclosure, when the second housing 320 moves in the first direction, the second area 330*b* of the display 330 may be extracted from the inner space 301. For example, as the second housing 320 moves in the second direction, the display 330 may extracted from the inner space 301 by passing between the second support member 321 and the first support member 311.

According to an embodiment of the disclosure, the electronic device 300 may include a support bar 331 supporting the display 330 and a guide rail 332. For example, the support bar 331 may include a plurality of bars coupled to each other, and may be manufactured in a shape corresponding to the shape of the second area 330*b* of the display 330. According to an embodiment of the disclosure, as the display 330 moves, the support bar 331 may move together with the display 330. According to an embodiment of the disclosure, in a first state in which the second area 330*b* of the display 330 is wound within the inner space 301, the support bar 331 may be wound within the inner space 301 together with the second area 330*b* of the display 330. As the second housing 320 moves in the first direction, the support bar 331 may move together with the second area 330*b* of the display 330. According to an embodiment of the disclosure, the guide rail 332 may guide the movement of the support bar 331. For example, as the display 330 moves, the support bar 331 may move along the guide rail 332 coupled to the third support member 313. According to an embodiment of the disclosure, the guide rail 332 may be coupled to the third support member 313 or the first support member 311. For example, the guide rail 332 may include a plurality of guide rails 332 that are spaced apart from each other at both peripheries of the third support member 313 that are spaced apart from each other along a third direction (e.g., +x direction) perpendicular to the first direction.

According to an embodiment of the disclosure, the driving unit 360 may provide a driving force to the second housing 320 so that the second housing 320 may move relative to the first housing 310. According to an embodiment of the disclosure, the driving unit 360 may include a motor 361, a pinion gear 362, and/or a rack gear 363. The motor 361 may receive power from the battery 350 and provide driving power to the second housing 320. According to an embodiment of the disclosure, the motor 361 may be disposed in the first housing 310 and may not move when the second housing 320 moves with respect to the first housing 310. For example, the motor 361 may be disposed in a recess formed in the third support member 313. According to an embodiment of the disclosure, the pinion gear 362 may be coupled to the motor 361 and may rotate by a driving force provided from the motor 361. According to an embodiment of the disclosure, the rack gear 363 be engaged with the pinion gear 362 and may move according to a rotation of the pinion gear 362. For example, the rack gear 363 may linearly reciprocate in the first direction or the second direction according to the rotation of the pinion gear 362. According to an embodiment of the disclosure, the rack gear 363 may be disposed in the second housing 320. For example, the rack gear 363 may be coupled to the second support member 321 included in the second housing 320. According to an embodiment of the disclosure, the rack gear 363 may be movable inside an operating space 313*p* formed in the third support member 313.

According to an embodiment of the disclosure, when the pinion gear 362 rotates along a first rotation direction (e.g., clockwise in FIG. 4B), the rack gear 363 may move in a first direction (e.g., +y direction). When the rack gear 363 moves along the first direction, the second housing 320 coupled to the rack gear 363 may move along the first direction. As the second housing 320 moves along the first direction, an area of the display 330 visible from the outside of the electronic device 300 may be expanded. When the pinion gear 362 rotates along a second rotation direction (e.g., counterclockwise in FIG. 4B), the rack gear 363 may move in a second direction (e.g., −y direction). When the rack gear 363 moves along the second direction, the second housing 320 coupled to the rack gear 363 may move along the second direction. As the second housing 320 moves along the second direction, an area of the display 330 visible from the outside of the electronic device 300 may be reduced.

In the above description, it has been described that the motor 361 and the pinion gear 362 are disposed in the first housing 310, and the rack gear 363 is disposed in the second housing 320, but embodiments may not be limited thereto. According to embodiments of the disclosure, the motor 361 and the pinion gear 362 may be disposed in the second housing 320, and the rack gear 363 may be disposed in the first housing 310.

Figure 5A:
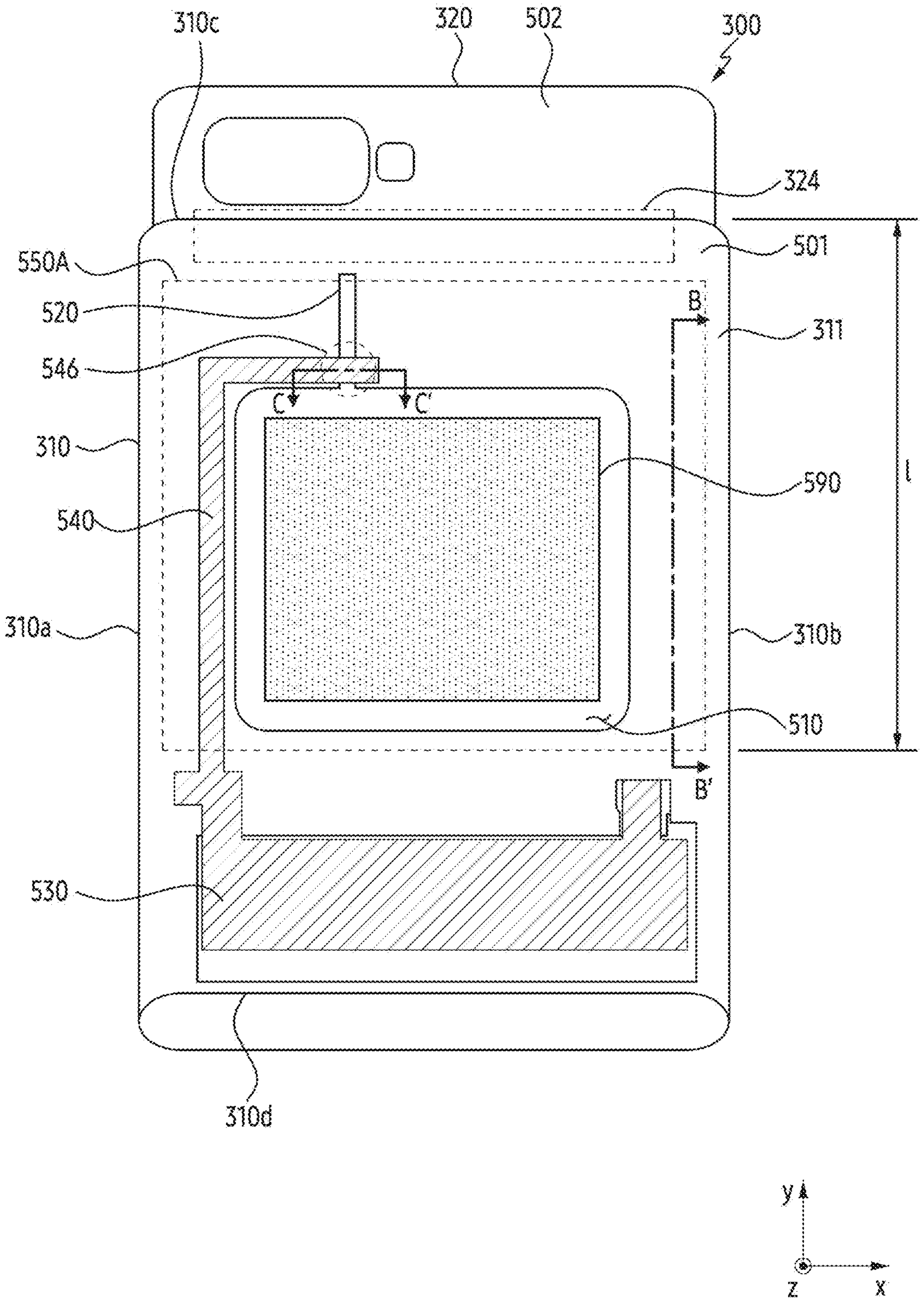
FIG. 5A illustrates a first state in which a rear plate of an electronic device is omitted according to an embodiment of the disclosure.
Figure 5B:
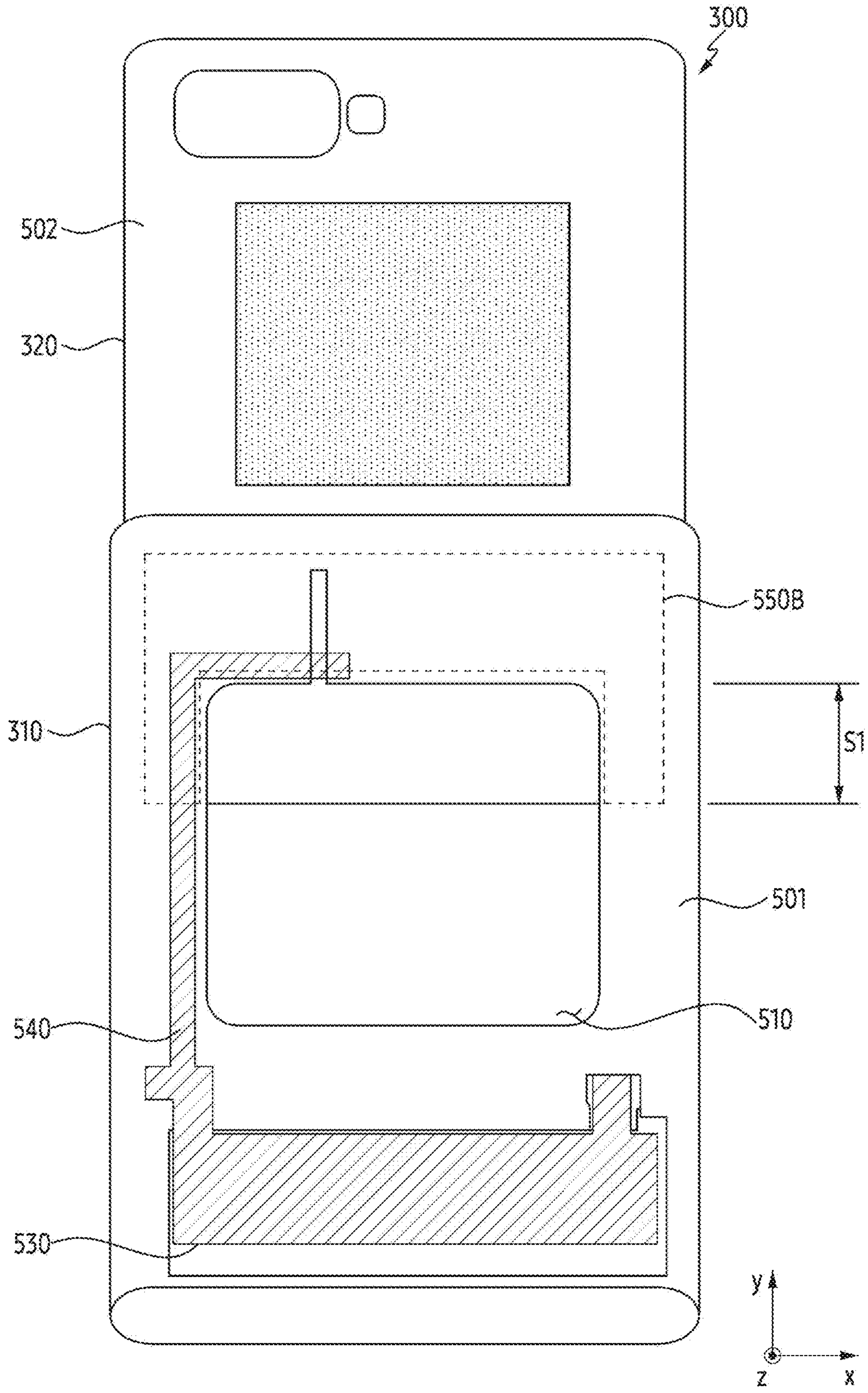
FIG. 5B illustrates a second state in which a rear plate of an electronic device is omitted according to an embodiment of the disclosure.

FIG. 5A illustrates a first state in which a rear plate of an electronic device is omitted according to an embodiment of the disclosure. FIG. 5B illustrates a second state in which a rear plate of an electronic device is omitted according to an embodiment of the disclosure.

Referring to FIGS. 5A and 5B, the electronic device 300 may include a first housing 310 and a second housing 320.

According to an embodiment of the disclosure, the first housing 310 may be a fixed housing of the electronic device 300, and may accommodate a portion of the second housing 320. The first housing 310 may be referred to as an outer housing. The second housing 320 may be referred to as an inner housing.

According to an embodiment of the disclosure, the second housing 320 may linearly reciprocate with respect to the first housing 310. The second housing 320 may be coupled to the first housing 310 to be movable along a first direction (+y direction) or a second direction (−y direction) opposite to the first direction (+y direction) with respect to the first housing 310.

According to an embodiment of the disclosure, the inside of the first housing 310 and the inside of the second housing 320 may be connected to each other. As the second housing 320 moves, a space formed by the first housing 310 and the second housing 320 may change. The components of the electronic device 300 may be disposed in the space formed by the first housing 310 and the second housing 320. For example, the components may include a portion (e.g., the second area 330*b* of FIG. 3C) of the display 330 (e.g., the display 330 of FIG. 3A), a battery, a driving unit (e.g., the driving unit 360 of FIG. 4A), or printed circuit boards 324 and 530. In an embodiment of the disclosure, a first printed circuit board 324 may be disposed in the second housing 320. A second printed circuit board 530 may be disposed in the first housing 310.

According to an embodiment of the disclosure, the first housing 310 may include a first support member 311. The first housing 310 may include a first plate 501 having an opening 510 formed on a surface of the first support member 311. For example, the opening 510 may overlap a wireless charging circuit 590 disposed in the first housing 310 or the second housing 320. The wireless charging circuit 590 may be disposed on a second plate 502 of the second housing 320 to overlap the opening 510 in the first state. For another example, the wireless charging circuit 590 may be disposed on a dielectric filling the opening 510 formed in the first plate 501.

In an embodiment of the disclosure, the second housing 320 may have the second plate 502 parallel to the first plate 501. The first plate 501 and the second plate 502 may include a conductive member. For example, the first plate 501 and the second plate 502 may be a conductive plate. The first plate 501 and the second plate 502 may operate as an antenna through interaction. For example, the second plate 502 may be electrically coupled to the first plate 501 by a current applied to the first plate 501.

According to an embodiment of the disclosure, the first plate 501 and the second plate 502 operating as an antenna may be electrically connected to a wireless communication circuit. The first printed circuit board 324 may be electrically connected to the second printed circuit board 530. The second printed circuit board 530 may include an extension portion 540 extending toward the slit 520. The second printed circuit board 530 may be electrically connected to the slit 520 formed in the first plate 501 through the extension portion 540. The extension portion 540 may include a portion of signal lines of the second printed circuit board 530. The extension part 540 may be a flexible printed circuit board extending from the second printed circuit board 530. According to an embodiment of the disclosure, the extension portion 540 may be formed separately from the second printed circuit board 530 and coupled to the second printed circuit board 530.

According to an embodiment of the disclosure, a portion of the conductive member included in the extension part 540 may be at least partially removed from a power supply area 546. For example, another conductive member, such as a ground layer other than a signal line inside the extension area 540 may be removed from the power supply area 546 of the extension area 540.

According to an embodiment of the disclosure, the slit 520 of the first plate 501 has been described as feeding power in the power supply area 546 through the extension portion 540 extending from the second printed circuit board 530, but is not limited thereto. For example, the slit 520 may be fed from a cable electrically connecting the first printed circuit board 324 and the second printed circuit board 530 or another printed circuit board. For another example, the slit 520 may not be formed in the first plate 501, but may be formed in the second plate 502. Power may be supplied to a slit formed in the second plate 502. The slit may be fed from a cable electrically connecting the first printed circuit board 324 and the second printed circuit board 530 or another printed circuit board.

According to an embodiment of the disclosure, the second printed circuit board 530 may be disposed on the first plate 501 of the first housing 310. For example, the second printed circuit board 530 may be disposed between the first plate 501 and the rear plate 312. The second printed circuit board 530 may be disposed adjacent to a lower portion of the electronic device 300. The second printed circuit board 530 may be disposed adjacent to a periphery of the first housing 310. The first housing 310 may include a first periphery 310*a* parallel to a direction in which the second housing 320 moves, a second periphery 310*b* facing the first periphery 310*a*, a third periphery 310*c* extending from an end of the first periphery 310*a* to an end of the second periphery 310*b* in a direction perpendicular to the first periphery 310*a*, and a fourth periphery 310*d* extending from another end of the first periphery 310*a* to another end of the second periphery 310*b*. The second printed circuit board 530 may be disposed closer to the fourth periphery 310*d* than the third periphery 310*c* of the first housing 310.

According to an embodiment of the disclosure, the second printed circuit board 530 may be connected to the first printed circuit board 324 through an additional board or cable. In an embodiment of the disclosure, the second printed circuit board 530 may supply power to the slit 520 through the extension portion 540 spaced apart from the first periphery 310*a* on the first plate 501 and extending along the first periphery 310*a* to the power supply area 546. For example, the extension portion 540 may extend along a periphery of the opening 510 formed in the first plate 501 and supply power through a portion overlapping the slit 520. According to an embodiment of the disclosure, the slit 520 may extend along the first direction from a periphery of the opening 510 facing the first direction. For example, the slit 520 may extend along the first direction from a periphery of the opening 510 parallel to the third periphery 310*c*. A length or width of the slit 520 may be changed based on a supported frequency band.

According to an embodiment of the disclosure, the first plate 501 including the conductive member may include the opening 510 and the slit 520. The first plate 501 may fed through the slit 520. The first plate 501 overlapping the second plate 502 may be coupled to the second plate 502 by feeding through the slit 520. The first plate 501 and the second plate 502 coupled to each other may operate as an antenna radiator. For example, the first plate 501 and the second plate 502 may be spaced apart parallel to each other and may operate similarly to a cavity antenna in an overlapping area 550A.

According to an embodiment of the disclosure, in the first state in which the second housing 320 is inserted into the first housing 310, as shown in FIG. 5A, the first plate 501 and the second plate 502 may overlap in a wider area than the second state. In the second state in which the second housing 320 is extracted from the first housing 310, as shown in FIG. 5B, the first plate 501 and the second plate 502 may overlap in a narrower area than the first state.

According to an embodiment of the disclosure, in the first state, an overlapping area 550A of the first plate 501 and the second plate 502 may operate as an antenna and may have a wider radiation volume than the second state. In the first state of the electronic device 300, at least one processor (e.g., the processor 120 of FIG. 1, the first communication processor 212 or the second communication processor 214 of FIG. 2) may communicate with an external electronic device in a first frequency band lower than the second state, through the first plate 501 and the second plate 502 operating as an antenna.

According to an embodiment of the disclosure, in the second state, an overlapping area 550B of the first plate 501 and the second plate 502 may operate as an antenna, and may have a narrower radiation volume than the first state. In the second state of the electronic device 300, at least one processor (e.g., the processor 120 of FIG. 1, the first communication processor 212 or the second communication processor 214 of FIG. 2) may communicate with an external electronic device in a second frequency band higher than the first state, through the overlapping area 550B of the first plate 501 and the second plate 502 operating as an antenna.

The electronic device 300 according to the above-described embodiment may reduce antenna module components by providing an antenna using overlapping housings. By reducing components mounted on the electronic device 300, it is possible to increase the utilization of an inner space.

Figure 5C:
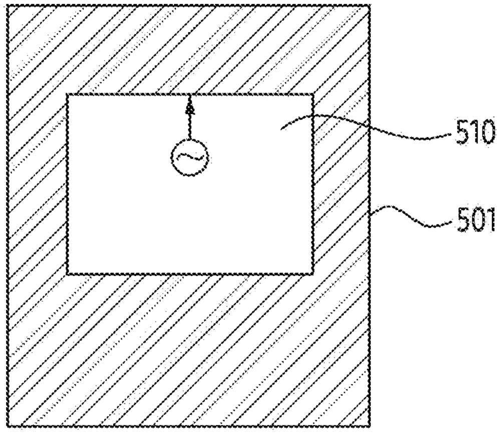
FIG. 5C illustrates antenna performance in case that a plate including an opening of an electronic device operates as an antenna, according to an embodiment of the disclosure.
Figure 5C:
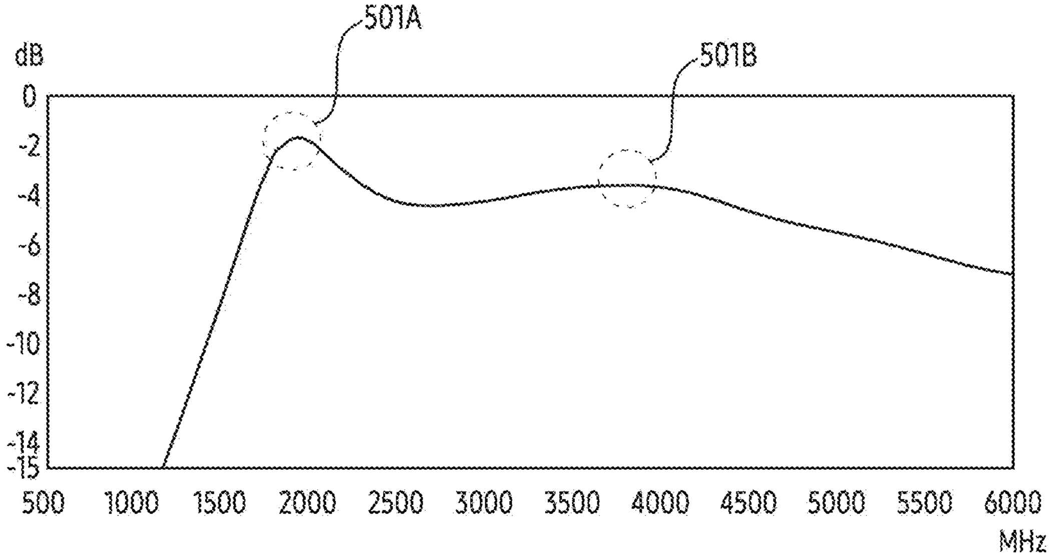
Figure 5D:
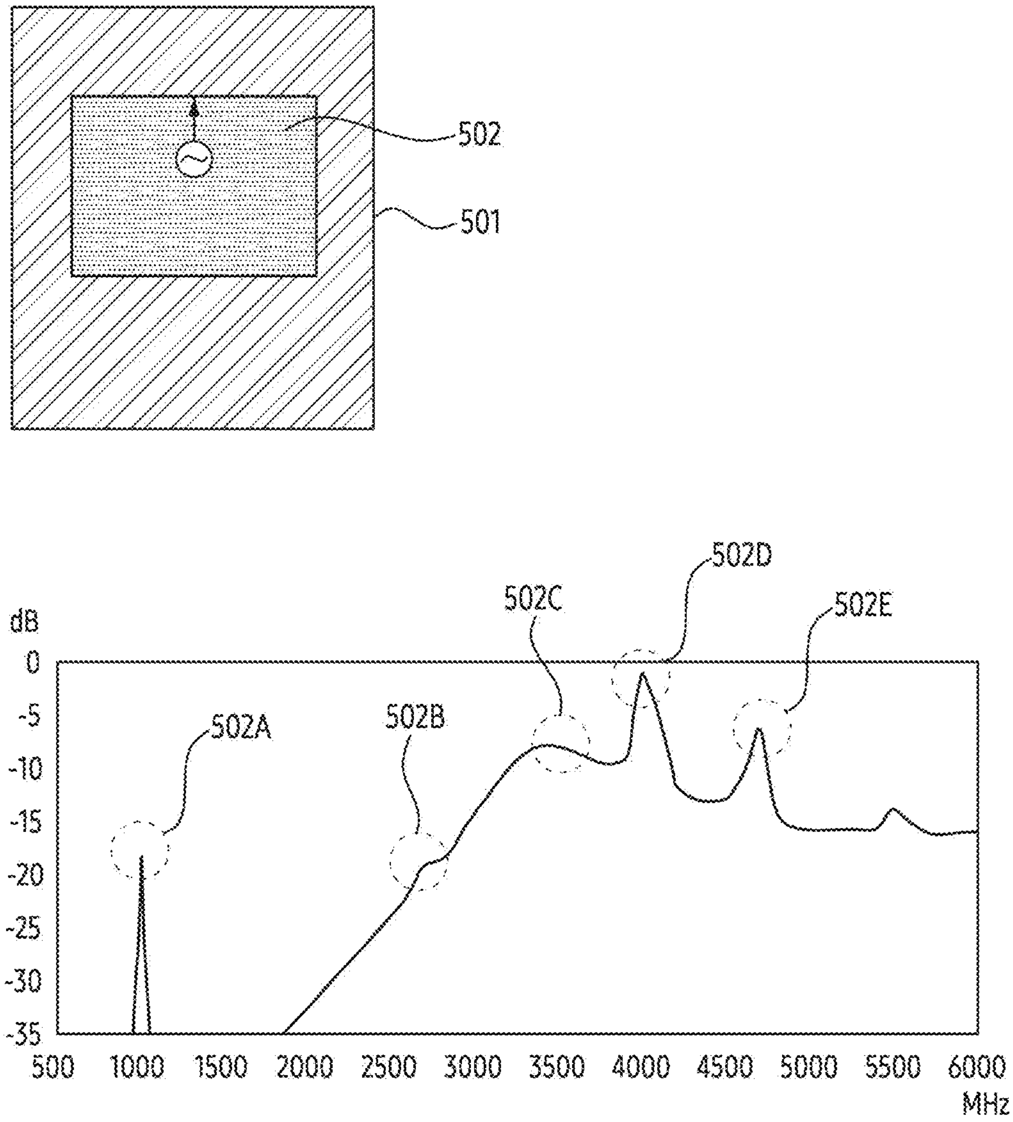
FIG. 5D illustrates antenna performance in case that overlapping plates of an electronic device operate as an antenna, according to an embodiment of the disclosure.

FIG. 5C illustrates antenna performance in case that a plate including an opening of an electronic device operates as an antenna, according to an embodiment of the disclosure. FIG. 5D illustrates antenna performance in case that overlapping plates of an electronic device operate as an antenna, according to an embodiment of the disclosure.

Referring to FIG. 5C, it is assumed that only the first plate 501 including the opening 510 operates as an antenna. The first plate 501 may operate as a slot antenna. The first plate 501 may be fed power in a form of crossing the opening 510 of the first plate 501.

When only the first plate 501 operates as an antenna, the antenna may include a first resonance frequency 501A and a second resonance frequency 501B. The first resonance frequency 501A may be approximately 1800 MHz, and the second resonance frequency 501B may be approximately 3800 MHz.

Referring to FIG. 5D, when the first plate 501 and the second plate 502 overlap each other, it is assumed that the first plate 501 and the second plate 502 operate as an antenna. The first plate 501 and the second plate 502 may operate as a cavity antenna. At a specific frequency, the first plate 501 may operate as a slot antenna by an opening formed in the first plate 501.

When the first plate 501 and the second plate 502 operate as an antenna, the antenna may include a plurality of resonant frequencies 502A, 502B, 502C, 502D, and 502E. The first resonance frequency 502A may be approximately 1000 MHz, the second resonance frequency 502B may be approximately 2800 MHz, the third resonance frequency 502C may be approximately 3700 MHz, the fourth resonance frequency 502D may be approximately 4000 MHz, and the fifth resonance frequency 502E may be approximately 4700 MHz.

According to an embodiment of the disclosure, the first resonance frequency 502A, the second resonance frequency 502B, the fourth resonance frequency 502D, and the fifth resonance frequency 502E may be determined by a cavity resonance generated by the first plate 501 and the second plate 502 being disposed parallel to each other. According to an embodiment of the disclosure, the third resonance frequency 502D may be determined by a slot resonance generated by an opening of the first plate 501. The third resonance frequency 502D of FIG. 5D may be substantially the same as the second resonance frequency 501B of FIG. 5C.

Figure 6:
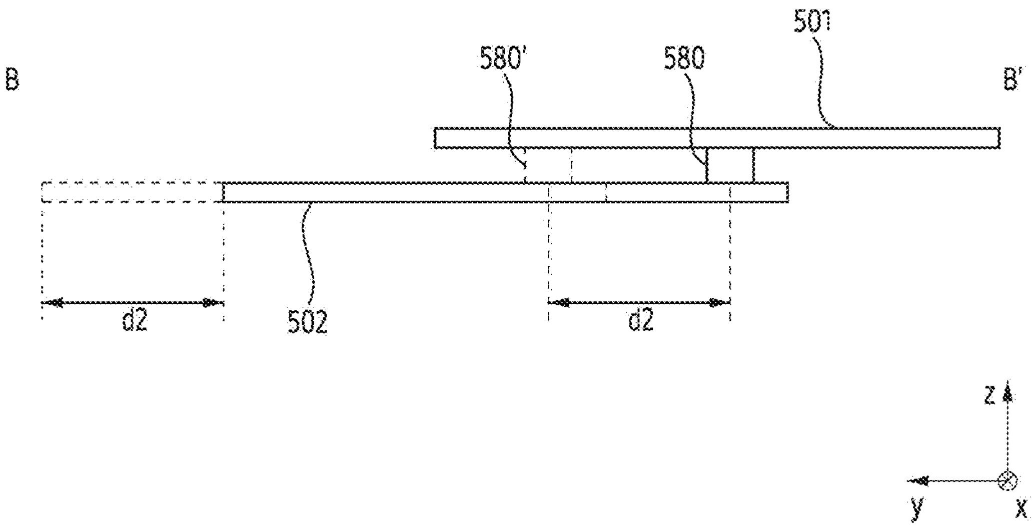
FIG. 6 is a cross-sectional view of the electronic device of FIG. 5A cut along line B-B', according to an embodiment of the disclosure.

FIG. 6 is a cross-sectional view of the electronic device of FIG. 5A cut along line B-B', according to an embodiment of the disclosure.

Referring to FIG. 6, a connecting member 580 connecting a first plate 501 and a second plate 502 may be included. The connecting member 580 may adjust a ground position of the first plate 501 and the second plate 502.

According to an embodiment of the disclosure, the connecting member 580 connected to a ground portion of the electronic device 300 may be disposed in a second housing 320 movable with respect to a first housing 310. The connecting member 580 may reduce the influence of the antenna located at a lower end (e.g., the second direction) of the electronic device 300. For example, since the connecting member 580 may be connected to the ground portion, current flow may not occur in an area located around the first plate 501, the second plate 502 and the connecting member 580. When an antenna including a conductive portion is driven, a parasitic resonance that may occur in the first plate 501 and the second plate may be reduced.

According to an embodiment of the disclosure, the connecting member 580 of the electronic device 300 may be a ground portion of the first plate 501 and the second plate 502. According to a position of the connecting member 580, an electrical length of the first plate 501 and the second plate 502 operating as an antenna may be adjusted. According to an embodiment of the disclosure, the connecting member 580 may be disposed in an area including peripheries perpendicular to a periphery of the opening 510 in which the slit 520 is formed. The connecting member 580 may be plural and may include a first connecting member and a second connecting member. For example, the connecting member 580 may include a first connecting member disposed between the first plate and the second plate within an area including a second periphery among peripheries perpendicular to a periphery of the opening in which the slit is formed, and a second connecting member disposed between the first plate and the second plate within an area including a third periphery facing the second periphery.

According to the above-described embodiment of the disclosure, the electronic device 300 may reduce the influence caused by an antenna disposed at the bottom of the electronic device 300, by disposing the connecting member 580 between the first plate 501 and the second plate 502. The connecting member 580 may adjust a resonance frequency, by adjusting the electrical length of the first plate 501 and the second plate 502.

Figure 7A:
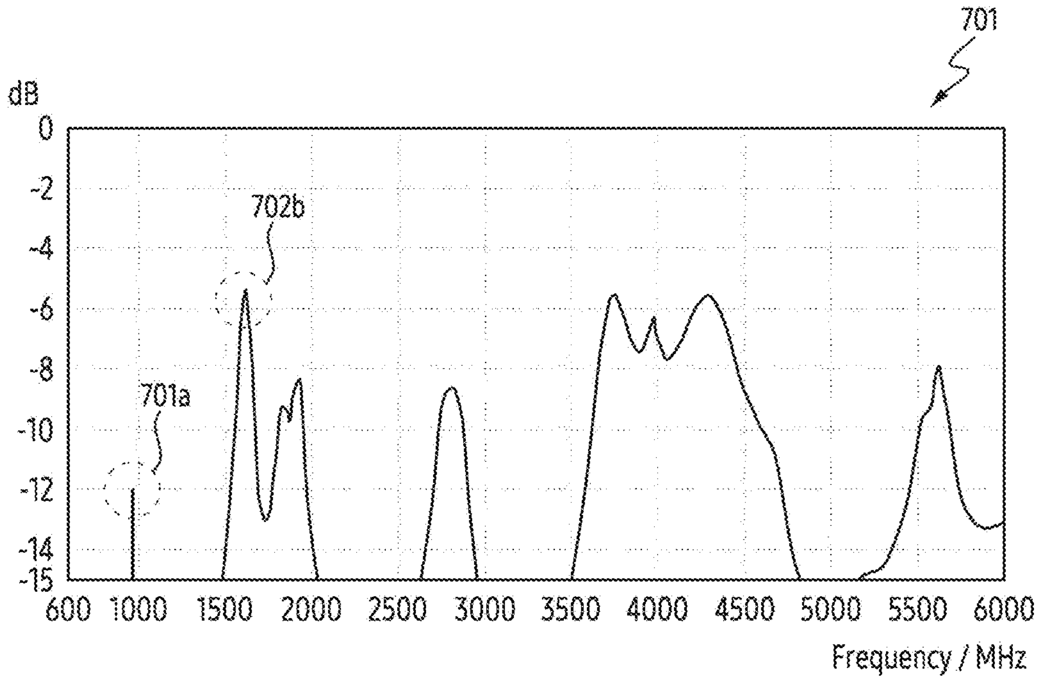
FIG. 7A is a graph illustrating a gain of an antenna using a first plate and a second plate when an electronic device is in a first state, according to an embodiment of the disclosure.
Figure 7B:
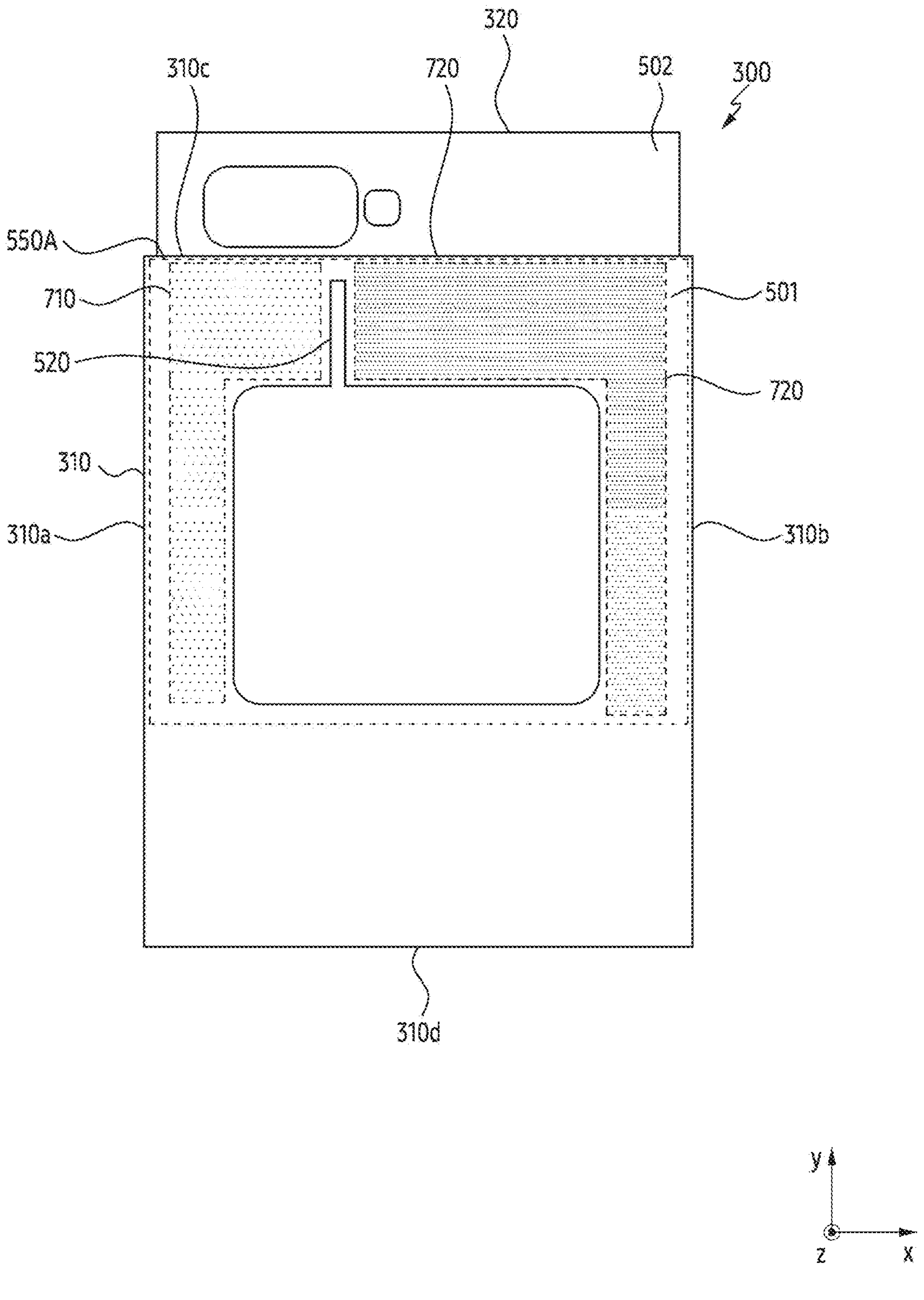
FIG. 7B illustrates a magnetic field distribution of an antenna using a first plate and a second plate in a first frequency band when an electronic device is in a first state, according to an embodiment of the disclosure.
Figure 7C:
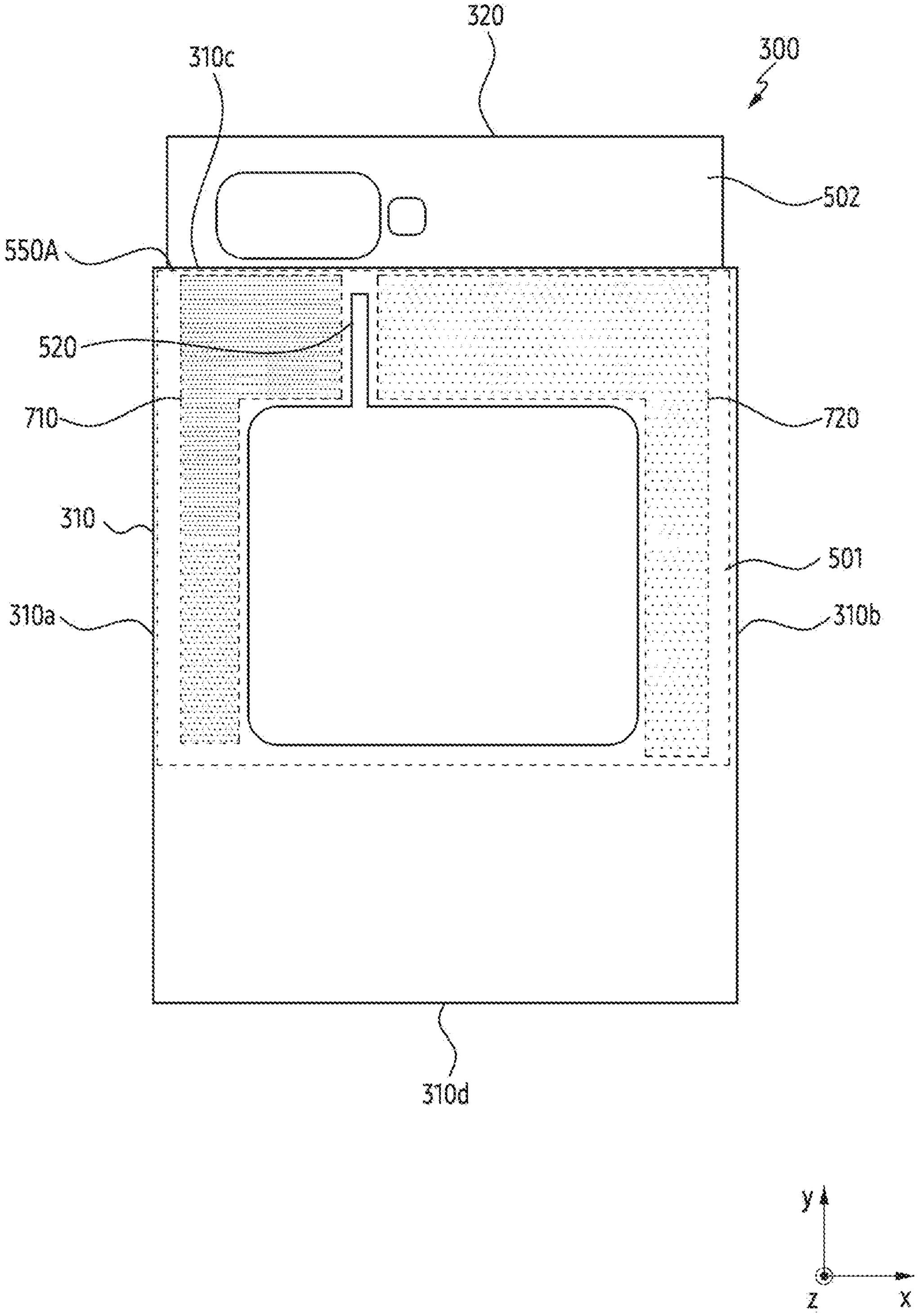
FIG. 7C illustrates a current distribution of an antenna using a first plate and a second plate in a second frequency band when an electronic device is in a first state, according to an embodiment of the disclosure.

FIG. 7A is a graph illustrating a gain of an antenna using a first plate and a second plate when an electronic device is in a first state, according to an embodiment of the disclosure. FIG. 7B illustrates a magnetic field distribution of an antenna using a first plate and a second plate in a first frequency band when an electronic device is in a first state, according to an embodiment of the disclosure. FIG. 7C illustrates a current distribution of an antenna using a first plate and a second plate in a second frequency band when an electronic device is in a first state, according to an embodiment of the disclosure.

Referring to FIG. 7A, the graph 701 illustrates a gain of an antenna using an overlapping area 550A of a first plate 501 and a second plate 502, in a first state in which a second housing 320 is inserted into a first housing 310. In the first state, the overlapping area 550A may have a first resonance frequency 701*a* and a second resonance frequency 701*b*. The first resonance frequency 701*a* may be approximately 1000 MHz, and the second resonance frequency 701*b* may be approximately 1600 MHz.

Referring to FIG. 7B, when an electronic device 300 in which the second housing 320 is inserted into the first housing 310 is in the first state, a magnetic field distribution when the overlapping area 550A operates as an antenna at the first resonance frequency 701*a* is illustrated. A magnetic field may be distributed in a first area 710 extending downward along a first periphery 310*a* along a left side of the third periphery 310*c* with respect to the slit 520, and a second area 720 extending downward along a right side of the third periphery 310*c* along the second periphery 310*b* with respect to the slit 520. The contrast between the first area 710 and the second area 720 may mean the intensity of the magnetic field.

According to an embodiment of the disclosure, in the first state, when a current in a band including the first resonance frequency 701*a* flows to the overlapping area 550A, the intensity of the magnetic field in the first area 710 may be smaller than the intensity of the magnetic field flowing in the second area 720. In the overlapping area 550A, the second area 720 may be an antenna operating at the first resonance frequency 701*a*. According to an embodiment of the disclosure, when looking at the distribution of the magnetic field, an area in which the actual magnetic field is highly distributed may mean an area operating as an antenna. The second area 720 in which the magnetic field is highly distributed may be an area operating as an antenna. The second area 720 in which the magnetic field is highly distributed may be an area through which a large amount of surface current flows during power supply.

Referring to FIG. 7C, when the electronic device 300 in which the second housing 320 is inserted into the first housing 310 is in the first state, the surface magnetic field distribution when the overlapping area 550A operates as an antenna at the second resonance frequency 701*b* is illustrated.

According to an embodiment of the disclosure, in the first state, when a current in a band including the second resonance frequency 701*b* flows to the overlapping area 550A, a magnetic field distributed in the first area 710 may be greater than a magnetic field distributed in the second area 720. In the overlapping area 550, the first area 710 may be an antenna operating at the second resonance frequency 701*b*. The first area 710 in which the magnetic field is highly distributed may be an area through which a large amount of surface current flows during power supply.

According to an embodiment of the disclosure, the overlapping area 550A may be divided into left and right areas with respect to the slit 520 and operated.

Referring to FIGS. 7B and 7C, in the first state, the first area 710 of the overlapping area 550A may have an area narrower than that of the second area 720.

Figure 8A:
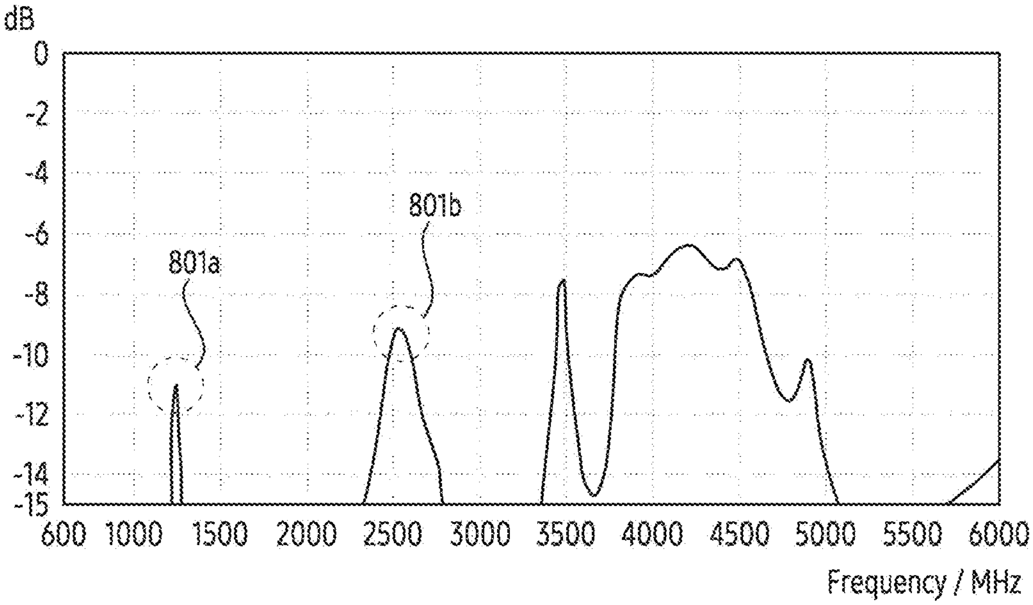
FIG. 8A is a graph illustrating a gain of an antenna using a first plate and a second plate when an electronic device is in a second state, according to an embodiment of the disclosure.
Figure 8B:
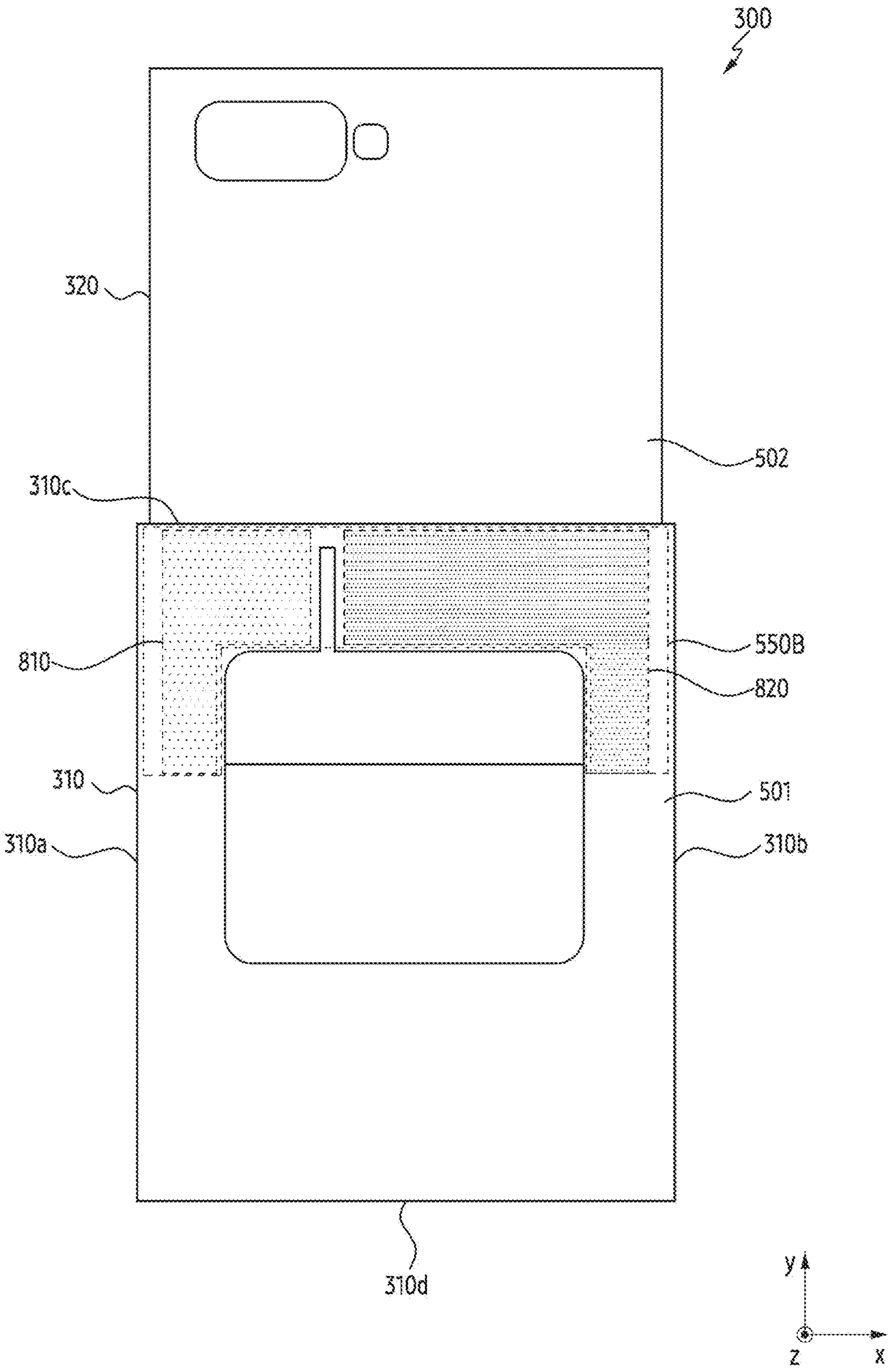
FIG. 8B illustrates a magnetic field distribution of an antenna using a first plate and a second plate in a third frequency band when an electronic device is in a second state, according to an embodiment of the disclosure.
Figure 8C:
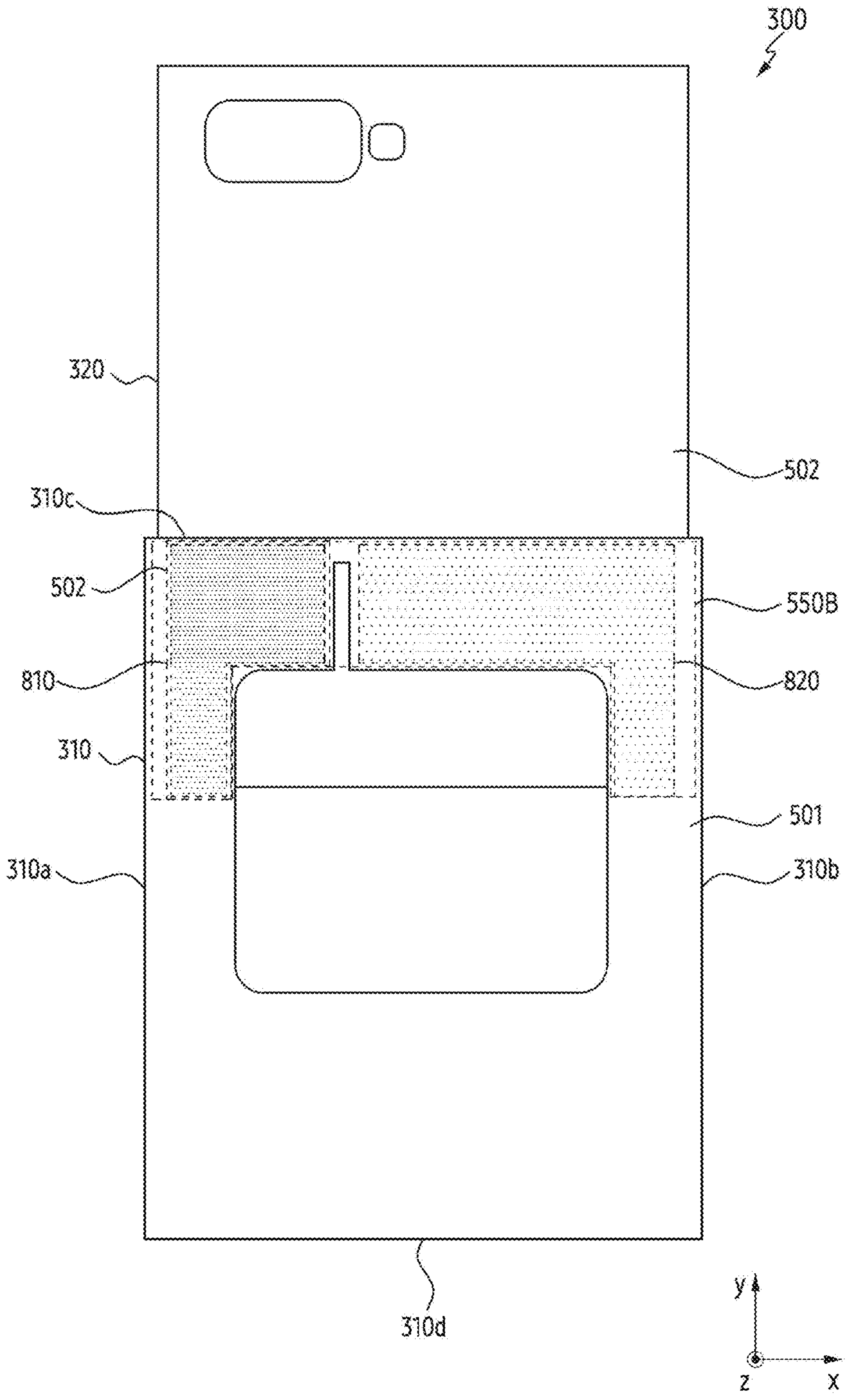
FIG. 8C illustrates a current distribution of an antenna using a first plate and a second plate in a fourth frequency band when an electronic device is in a second state, according to an embodiment of the disclosure.

FIG. 8A is a graph illustrating a gain of an antenna using a first plate and a second plate when an electronic device is in a second state, according to an embodiment of the disclosure. FIG. 8B illustrates a magnetic field distribution of an antenna using a first plate and a second plate in a third frequency band when an electronic device is in a second state, according to an embodiment of the disclosure. FIG. 8C illustrates a current distribution of an antenna using a first plate and a second plate in a fourth frequency band when an electronic device is in a second state, according to an embodiment of the disclosure.

Referring to FIG. 8A, the graph 801 illustrates a gain of an antenna using an overlapping area 550B of a first plate 501 and a second plate 502 in a second state in which a second housing 320 is extracted to the first housing 310. In the second state, the overlapping area 550B may have a third resonance frequency 801*a* and a fourth resonance frequency 801*b*. The third resonance frequency 801*a* may be approximately 1200 MHz, and the fourth resonance frequency 801*b* may be approximately 2500 MHz.

Referring to FIG. 8B, when the electronic device 300 in which the second housing 320 is extracted to the first housing 310 is in the second state, a magnetic field distribution when the overlapping area 550B operates as an antenna at the first resonance frequency 801*a* is illustrated. A current may flow in a third area 810 extending along a left side of the third periphery 310*c* and extending downward along the first periphery 310*a*, with respect to the slit 520, and may flow in the fourth area 820 extending along a right side of the third periphery 310*c* and extending downward along the second periphery 310*b*, with respect to the slit 520. The contrast between the third area 810 and the fourth area 820 may mean the intensity of the magnetic field.

According to an embodiment of the disclosure, in the second state, when a current in a band including the third resonance frequency 801*a* flows to the overlapping area 550B, the intensity of the magnetic field distributed in the third area 810 may be smaller than the intensity of the magnetic field distributed in the fourth area 820. In the overlapping area 550B, the fourth area 820 may be an antenna operating at the third resonance frequency 801*a*.

Referring to FIG. 8C, when the electronic device 300 in which the second housing 320 is extracted to the first housing 310 is in the second state, the distribution of magnetic fields when the overlapping area 550B operates as an antenna at the fourth resonance frequency 801*b* is illustrated.

According to an embodiment of the disclosure, in the first state, when a current in a band including the fourth resonance frequency 801*b* flows to the overlapping area 550B, the intensity of the magnetic field distributed in the third area 810 may be greater than the intensity of the magnetic field distributed in the fourth area 820. In the overlapping area 550B, the third area 810 may be an antenna operating at the fourth resonance frequency 801*b*. According to an embodiment of the disclosure, the overlapping area 550A may be divided into left and right areas with respect to the slit 520 and operated.

Referring to FIGS. 8B and 8C, in the second state, the third area 810 among the overlapping area 550B may have an area narrower than that of the fourth area 820. Since the radiation volume of the fourth area 820 is greater than that of the third area 810, the third resonance frequency 801*a* at which the fourth area 820 operates as an antenna may be lower than the fourth resonance frequency 801*b* at which the third area 810 operates as an antenna.

In the electronic device 300 according to an embodiment of the disclosure, as the area of the overlapping area 500A or 500B is changed according to a state of the electronic device 300, a band of resonant frequencies may be changed. According to an embodiment of the disclosure, a frequency band including the second resonant frequency 701*b* in the first state of the electronic device 300 may overlap a frequency band including the third resonant frequency 801*a* in the second state of the electronic device 300. By tuning the overlapping area 550A or 550B so that the second resonance frequency 701*b* coincides with the third resonance frequency 801*a*, the electronic device 300 may provide an antenna using the second resonance frequency 701*b* or the third resonance frequency 801*a* regardless of a state change of the electronic device 300.

Figure 9A:
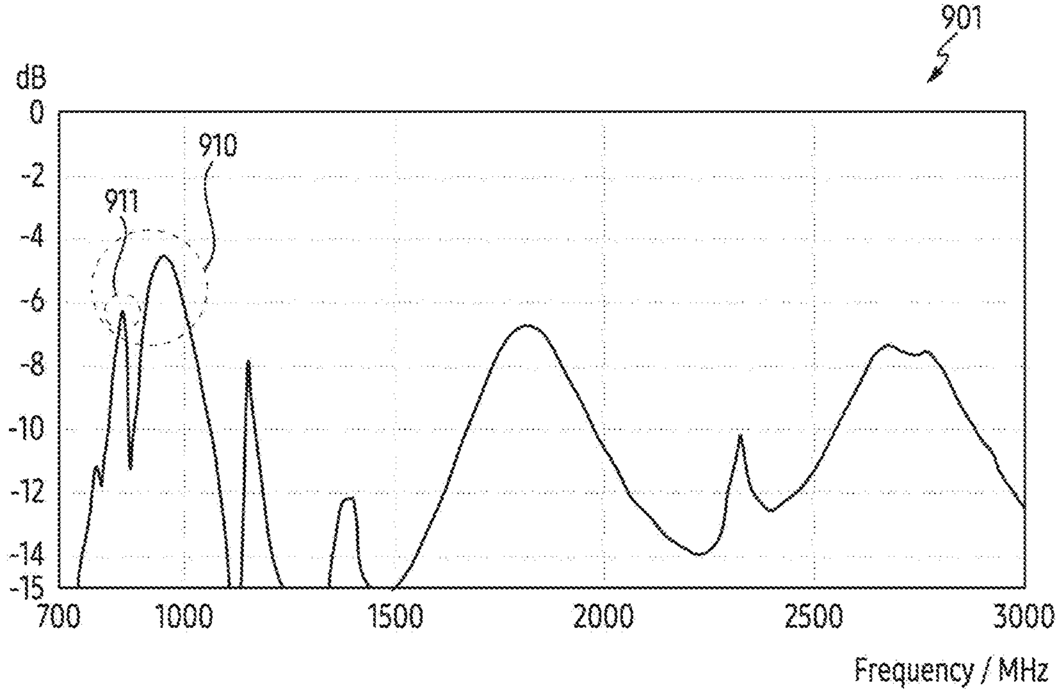
FIG. 9A illustrates a gain of an antenna operated by a portion of a conductive portion included in a housing when an electronic device does not include a connecting member according to an embodiment of the disclosure.
Figure 9B:
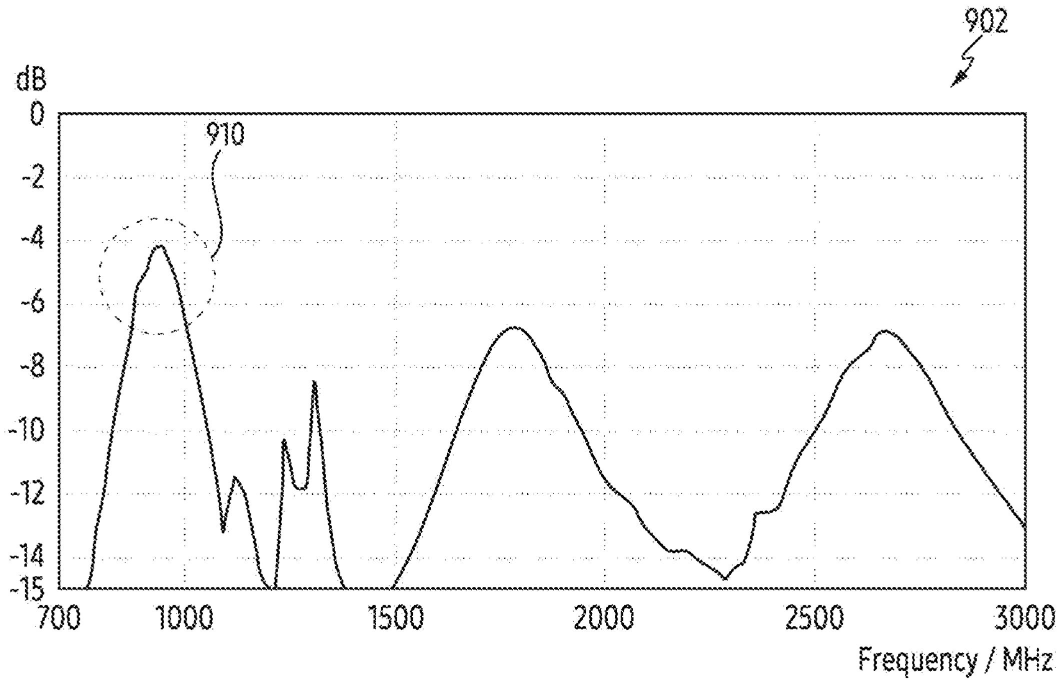
FIG. 9B illustrates a gain of an antenna operated by a portion of a conductive portion included in a housing when an electronic device includes a connecting member according to an embodiment of the disclosure.

FIG. 9A illustrates a gain of an antenna operated by a portion of a conductive portion included in a housing when an electronic device does not include a connecting member according to an embodiment of the disclosure. FIG. 9B illustrates a gain of an antenna operated by a portion of a conductive portion included in a housing when an electronic device includes a connecting member according to an embodiment of the disclosure.

A graph 901 of FIG. 9A and a graph 902 of FIG. 9B indicate the influence caused by an overlapping area of a first plate 501 and a second plate 502 when an antenna using a conductive portion included in a side surface of a housing (e.g., the first housing 310 of FIG. 5A) of the electronic device (e.g., the electronic device 300 of FIG. 5A) operates. For example, the antenna may be an antenna using a conductive portion included in a side surface located at a fourth periphery (e.g., the fourth periphery 310*d* of FIG. 8B) among side surfaces of the first housing 310. The antenna may be referred to as a lower antenna.

Referring to FIG. 9A, the graph 901 indicates a gain of the antenna when a connecting member 580 disposed between a first plate (e.g., the first plate 501 of FIG. 6) and a second plate (e.g., the second plate 502 of FIG. 6) does not exist.

Referring to the graph 901, it may be seen that an additional parasitic resonance 911 occurs in a first area 910 having a resonance frequency. The parasitic resonance 911 may be generated by an interaction between an overlapping area 550A or 550B and the lower antenna. The connecting member 580 of FIG. 6 may be disposed close to a periphery (e.g., the fourth periphery 310*d*) on which the lower antenna is located among peripheries of the first housing 310. The connecting member 580 may block the parasitic resonance generated between the first plate 501 and the second plate 502. A resonance length of the overlapping area 550A or 550B between the first plate 501 and the second plate 502 may be determined based on a position of the connecting member 580.

Referring to FIG. 9B, the graph 902 indicates a gain of the lower antenna when a connecting member 580 disposed between the first plate 501 and the second plate 502 exists.

Referring to the graph 902, it may be seen that the parasitic resonance 911 is removed in the first area 910 having the resonance frequency, unlike the graph 901. The connecting member 580 may connect an area connected to the connecting member 580 of the first plate 501 and the second plate 502 and a ground area. In the area connected to the connecting member 580 connected to the ground area, a potential difference between the first plate 501 and the second plate 502 is reduced, and thus a current flow may be reduced. The first plate 501 and the second plate 502 in the area connected to the connecting member 580 in which the flow of current is reduced may reduce interaction with the lower antenna. By the reduced interaction, the parasitic resonance generated in the lower antenna may be reduced.

Figure 10:
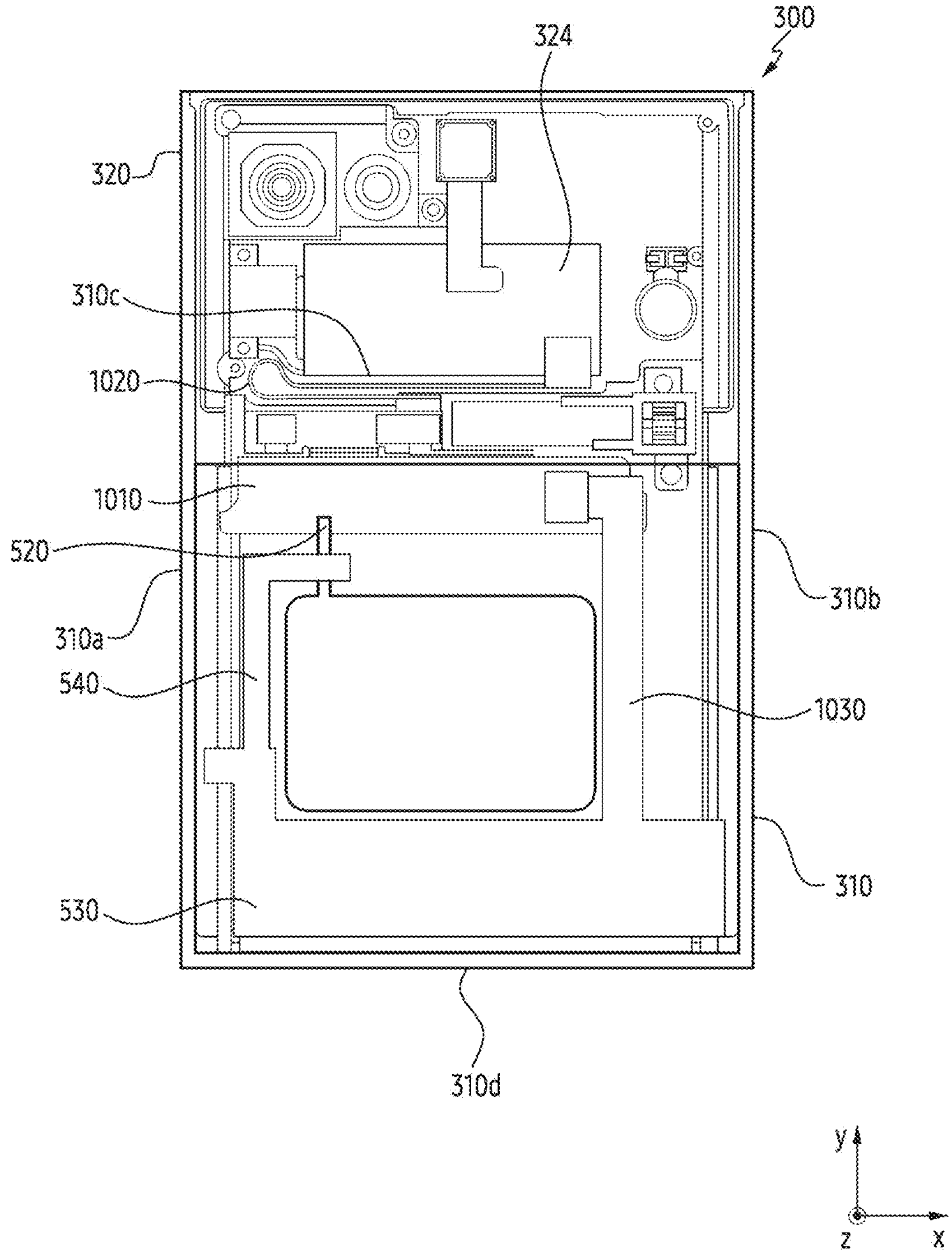
FIG. 10 illustrates transmission lines disposed inside an electronic device according to an embodiment of the disclosure.

FIG. 10 illustrates transmission lines disposed inside an electronic device according to an embodiment of the disclosure.

Figure 11:
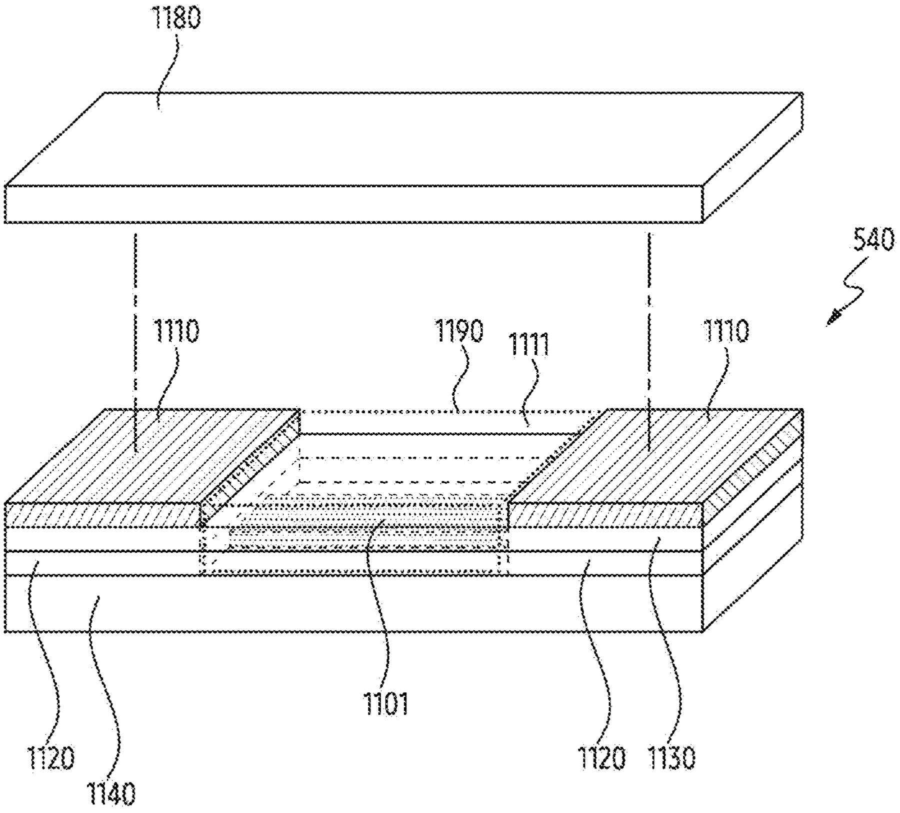
FIG. 11 is a drawing of an extension portion cut along line C-C' of FIG. 5A according to an embodiment of the disclosure.

FIG. 11 is a drawing of an extension portion cut along line C-C' of FIG. 5A according to an embodiment of the disclosure.

Referring to FIG. 10, an electronic device 300 may include a first printed circuit board 324, a second printed circuit board 530, and/or a third printed circuit board 1010. In an embodiment of the disclosure, the first printed circuit board 324 may be disposed in a second housing 320. As another example, the second printed circuit board 530 and the third printed circuit board 1010 may be disposed in a first housing 310. The electronic device 300 may include flexible printed circuit boards or cables electrically connecting the first printed circuit board 324, the second printed circuit board 530, and the third printed circuit board 1010. For example, the electronic device 300 may include a flexible printed circuit board 1020, extension portions 540 and 1030 (e.g., the extension portion 540 of FIG. 5A) forming a conductive path. The extension portions 540 and 1030 may be referred to as flexible printed circuit boards. For example, the extension portions 540 and 1030 may include a portion of signal lines of the second printed circuit board 530. The extension portions 540 and 1030 may be flexible printed circuit boards extending from the second printed circuit board 530. According to an embodiment of the disclosure, the extension part 540 may provide a conductive path extending from the second printed circuit board 530 to the slit 520. The extension portion 1030 may provide a conductive path extending from the second printed circuit board 530 to the third printed circuit board 1010. According to an embodiment of the disclosure, the extension portions 540 and 1030 may be formed separately from the second printed circuit board 530 and coupled to the second printed circuit board 530.

According to an embodiment of the disclosure, with respect to the first housing 310, the second housing 320 may move in a first direction (+y direction) or a second direction (−y direction). A distance between the second printed circuit board 530 and the third printed circuit board 1010 disposed in the first housing 310 and the first printed circuit board 324 disposed in the second housing 320 may be changed according to the movement of the second housing 320. A flexible printed circuit board for connecting the first printed circuit board 324 disposed in the second housing 320 and the second printed circuit board 530 and/or the third printed circuit board 1010 disposed in the first housing 310 may be disposed. In an embodiment of the disclosure, the flexible printed circuit board 1020 may connect the first printed circuit board 324 and the third printed circuit board 1010. For example, an end of the flexible printed circuit board 1020 may be connected to the first printed circuit board 324, and another end of the flexible printed circuit board 1020 may be connected to the third printed circuit board 1010. The flexible printed circuit board 1020 may be disposed in a folded state between the first printed circuit board 324 and the third printed circuit board 1010, in the first state as shown in FIG. 10. The flexible printed circuit board 1020 may be disposed in an unfolded state between the first printed circuit board 324 and the third printed circuit board 1010 when the electronic device 300 is in the second state.

According to an embodiment of the disclosure, the second extension portion 1030 may electrically connect the second printed circuit board 530 and the third printed circuit board 1010. The first extension portion 540 may extend from the second printed circuit board 530 along the first periphery 310*a*, extend in a direction parallel to the third periphery 310*c*, and extend to the slit 520. In an embodiment of the disclosure, the second printed circuit board 530 may be electrically connected to an antenna disposed at the fourth periphery 310*d* of the first housing 310. For example, the second printed circuit board 530 may be disposed at a lower end (e.g., an area facing the fourth periphery 310*d*) of the first housing 310, for signal transmission to the lower antenna using the conductive portion of the fourth periphery 310*d* as an antenna. The third printed circuit board 1010 may be connected to the second extension portion 1030 to electrically connect an electrical material positioned in the first housing 310 and an electrical material positioned in the second housing 320.

According to an embodiment of the disclosure, the slit 520 may be power supplied through the first extension portion 540. For example, the slit 520 may be electrically connected to the second printed circuit board 530 through the first extension portion 540. The second printed circuit board 530 may be electrically connected to the third printed circuit board 1010 through the second extension portion 1030. The third printed circuit board 1010 may be electrically connected to the first printed circuit board 324 through the flexible printed circuit board 1020. A wireless communication signal may supply power to the slit 520 from the first printed circuit board 324 on which a wireless communication circuit including at least one processor (e.g., the processor 120 of FIG. 1, the communication processor 212 or the second communication processor 214 of FIG. 2) is disposed through the flexible printed circuit board 1020, the third printed circuit board 1010, the second extension portion 1030, the second printed circuit board 530, and the first extension portion 540.

The above-described embodiments have been described that the slit 520 is formed in the first housing 310, but are not limited thereto. The slit 520 may be formed in the second metal plate 502 of the second housing 320 to fed power from the first printed circuit board 324. For example, a slit formed in a conductive portion (e.g., the second plate 502) of the second housing 320 may be fed power by a conductive path extending from the first printed circuit board 324. The second plate 502 may be fed power from the first printed circuit board 324 and coupled to the first plate 501 so that an overlapping area between the first plate 501 and the second plate 502 may be used as an antenna radiator. According to an embodiment of the disclosure, a conductive path extending from the first printed circuit board 324 may be electrically connected to the second plate 502 and may transmit a data signal from a wireless communication circuit included in the first printed circuit board 324 to the second plate.

Referring to FIG. 11, an end portion of the extension portion 540 in a power supply area (e.g., the power supply area 546 of FIG. 5A) is illustrated. The extension portion 540 may include a layer 1120 including a signal line 1101 and a ground layer 1110. The extension portion 540 may further include non-conductive layers 1130 and 1140 disposed in the layer 1120 including the signal line 1101 and the ground layer 1110.

According to an embodiment of the disclosure, the non-conductive layers 1130 and 1140 may include a first non-conductive layer 1130 and a second non-conductive layer 1140. The first non-conductive layer 1130 may be disposed on the layer 1120 including the signal line 1101 disposed in the second non-conductive layer 1140. The ground layer 1110 may be disposed on the first non-conductive layer 1130. The ground layer 1110 and the signal line 1101 may include a conductive material. The conductive material may be a metal, such as copper, gold, or silver.

According to an embodiment of the disclosure, the first non-conductive layer 1130 and/or a portion 1111 of the ground layer 1110 may be removed. For example, in an area 1119 corresponding to the slit 520, the portion 1111 of the ground layer 1110 may be removed in order to supply power to the slit 520 through the signal line 1101. For example, other conductive members, such as the ground layer 1110 other than the layer 1120 including the signal line 1101 inside the extension area 540 may be removed from an area 1190 corresponding to the slit 520.

According to an embodiment of the disclosure, the extension portion 540 may be fixed and grounded in the power supply area 546 in which the slit 520 is disposed, by an adhesive member 1180. The adhesive member 1180 may be a conductive tape including a conductive material.

Figure 12:
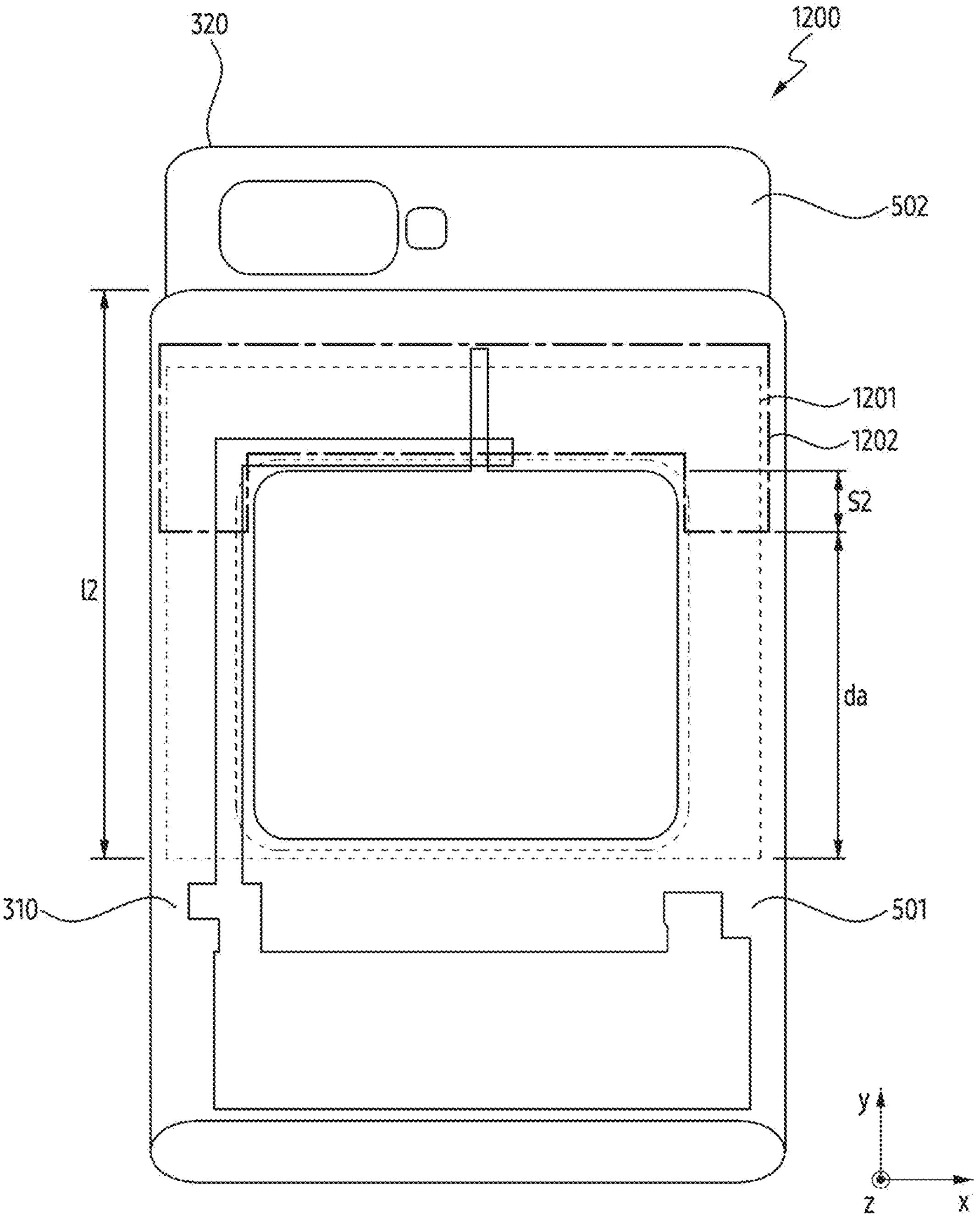
FIG. 12 illustrates deforming of an overlapping area between a first plate and a second plate according to an embodiment of the disclosure.

FIG. 12 illustrates deforming an overlapping area between a first plate and a second plate according to an embodiment of the disclosure.

Figure 13:
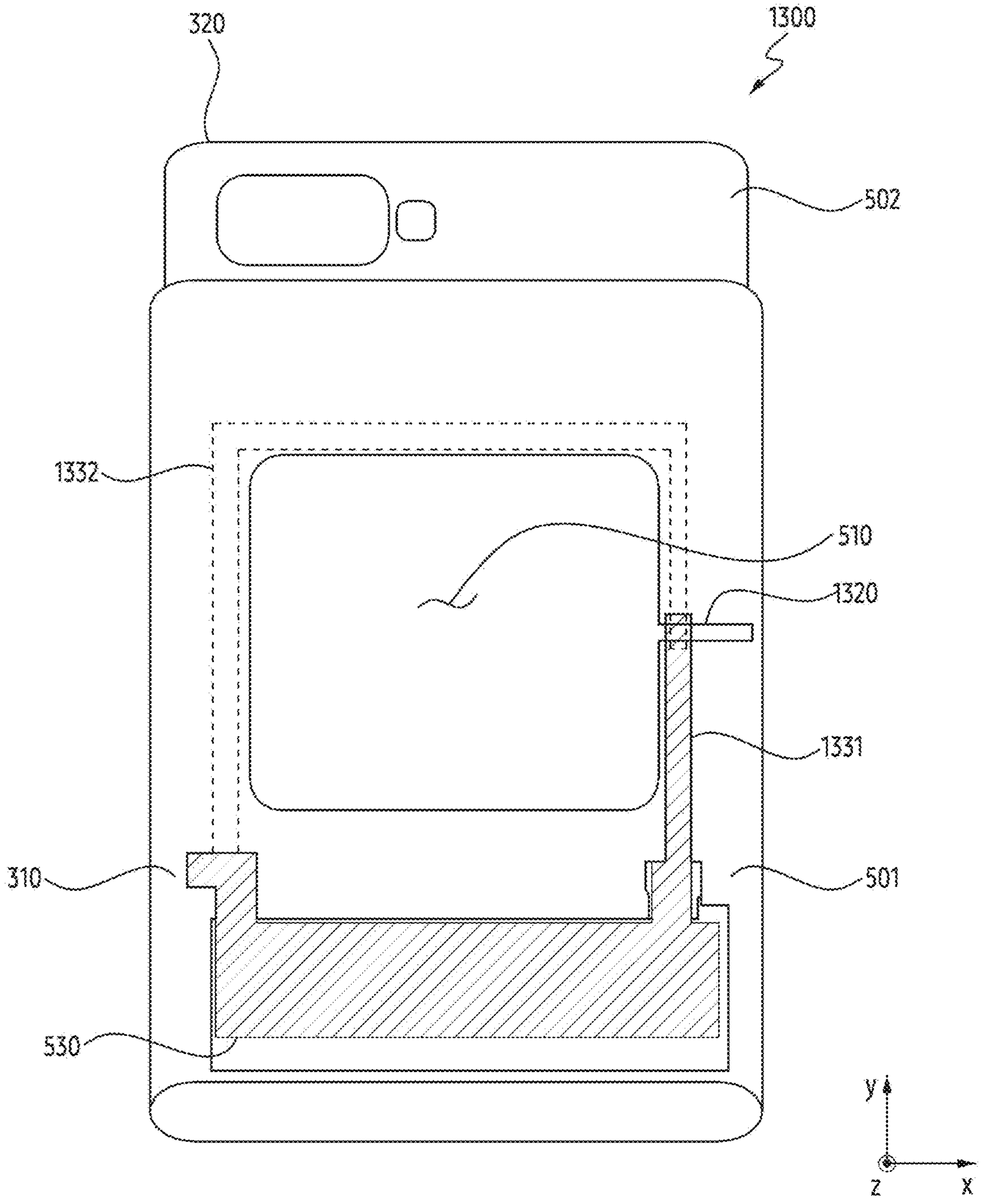
FIG. 13 illustrates adjusting of a position of a slit formed on a first plate according to an embodiment of the disclosure.

FIG. 13 illustrates adjusting of a position of a slit formed on a first plate according to an embodiment of the disclosure.

Figure 14A:
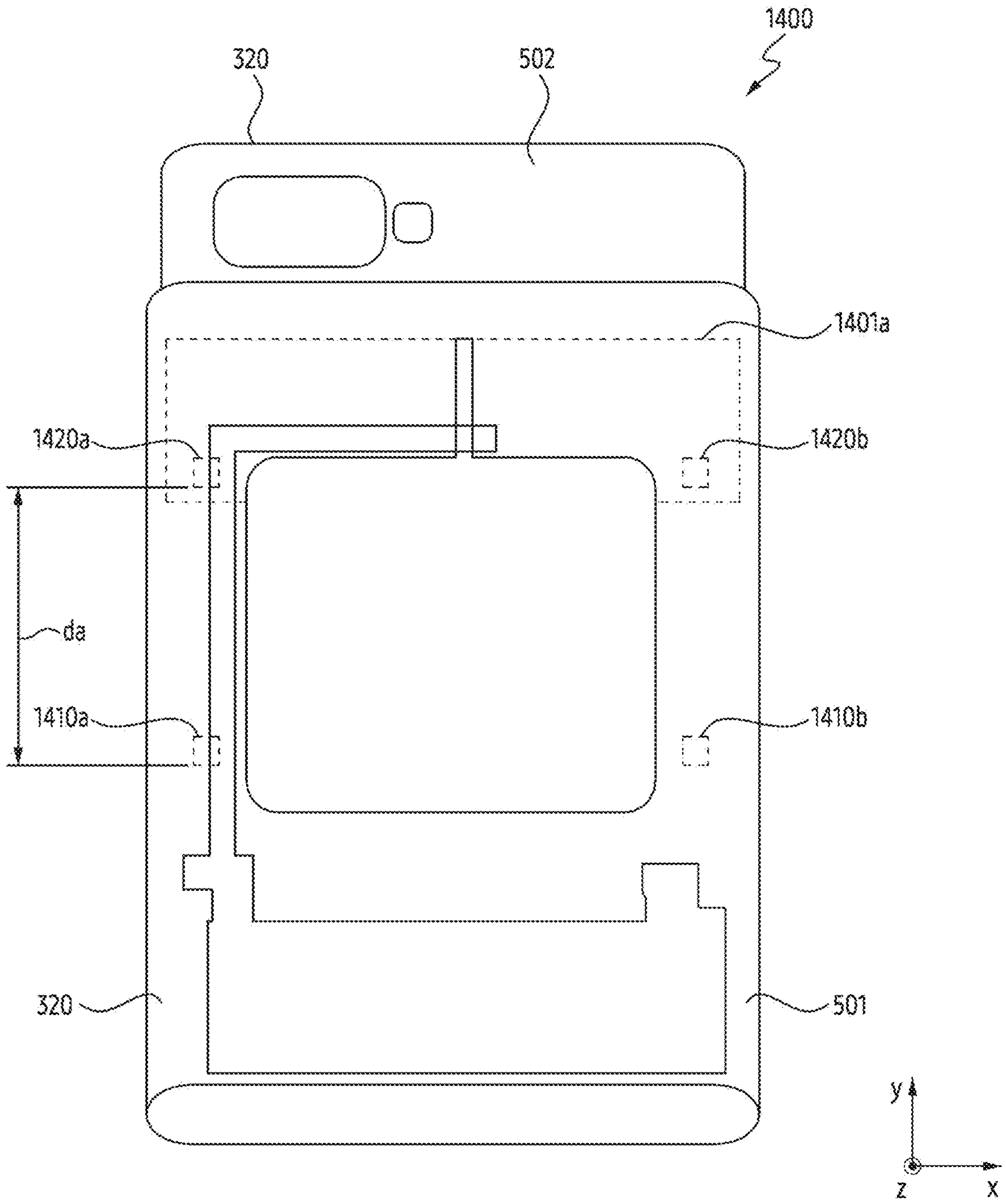
FIGS. 14A and 14B illustrate adjusting of a position of a contact disposed between a first plate and a second plate according to various embodiments of the disclosure.
Figure 14B:
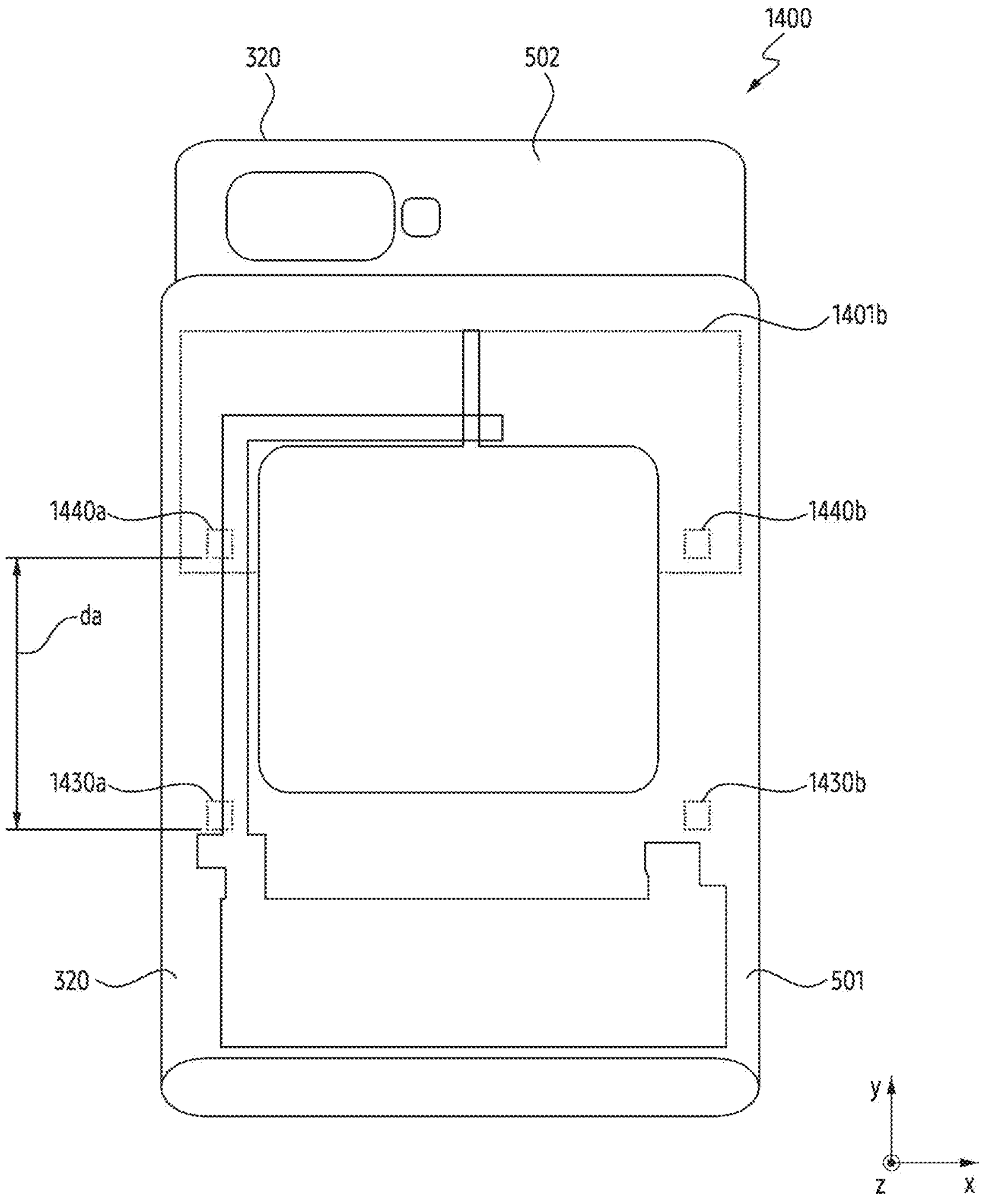

FIGS. 14A and 14B are an example of adjusting a position of a contact disposed between a first plate and a second plate according to various embodiments of the disclosure.

Referring to FIG. 12, the electronic device may include a first housing 310 and a second housing 320 movably coupled to the first housing 310.

According to an embodiment of the disclosure, the first plate 501 of the first housing 310 and the second plate 502 of the second housing 320 may overlap each other. An overlapping area 1201 of the first plate 501 and the second plate 502 in the first state may be different from an overlapping area 1202 between the first plate 501 and the second plate 502 in the second state.

According to an embodiment of the disclosure, the second housing 320 may move by a designated distance da, with respect to the first housing 310. The designated distance da may be a maximum distance that the second housing 320 can move. The designated distance da may be a distance when the second housing 320 moves from the first state to the second state. The overlapping area 1201 in the first state and the overlapping area 1202 in the second state may be determined by the designated distance da.

According to an embodiment of the disclosure, when the designated distance da is determined, the overlapping area 1201 in the first state may be determined by a width or a length of the second plate 502 of the second housing 320. For example, when a length l2 of the second plate 502 of the second housing 320 overlapping the first plate 501 is long, an area of the overlapping area 1201 in the first state may increase, and when the length l2 of the second plate 502 of the second housing 320 overlapping the first plate 501 is short, the area of the overlapping area 1201 in the first state may decrease.

According to an embodiment of the disclosure, when the designated distance da is determined, the overlapping area 1202 in the second state may be determined by a width or a length of the second plate 502 of the second housing 320. For example, when the length l2 of the second plate 502 of the second housing 320 overlapping the first plate 501 is long, an area of the overlapping area 1202 in the second state may increase, and when the length l2 of the second plate 502 of the second housing 320 overlapping the first plate 501 is short, the area of the overlapping area 1202 in the second state may decrease.

According to an embodiment of the disclosure, since the overlapping area in the first state is relatively larger than the overlapping area in the second state, the effect on the resonance frequency by the length l2 of the second plate 502 may be relatively small.

The length l of FIG. 5A may be longer than the length l2 of FIG. 12. An electrical length of the antenna may be determined according to an overlapping length S2 between an opening (e.g., the opening 510 of FIG. 5A) and the second plate 502 in the second state. An overlapping area S1 between the opening 510 and the second plate 502 of FIG. 5B may be relatively wider than an overlapping area S2 between the opening 510 and the second plate 502 of FIG. 12. The second plate 502 of FIG. 5B having a relatively wide overlapping area S1 may have an antenna gain higher than the second plate 502 of FIG. 12, and may ensure an electrical length for a resonance frequency.

According to an embodiment of the disclosure, by adjusting the area of the overlapping area 1202 in the second state, one of resonance frequencies of the overlapping area 1201 in the first state may be matched to one of resonance frequencies of the overlapping area 1202 in the second state.

Referring to FIG. 13, an electronic device 1300 may include a first housing 310 and a second housing 320. The first plate 501 of the first housing 310 may include a first opening 510 and a slit 1320. The slit 1320 may be a slit for feeding power to an overlapping area when the overlapping area of the first plate 501 and the second plate 502 is operated as an antenna. By adjusting a position of the slit 1320, resonance frequencies in the first state and the resonance frequencies in the second state may be adjusted. The slit 1320 whose position has been adjusted may be fed power through an extension portion 1331 or 1332 extending from the second printed circuit board 530 (e.g., the second printed circuit board 530 of FIG. 5B). The extension portion 1331 or 1332 may extend to the slit 1320 along a periphery of the opening 510.

According to an embodiment of the disclosure, by adjusting a feeding point in the overlapping area in the second state, one of resonant frequencies in the overlapping area in the first state may be matched with one of resonant frequencies in the overlapping area in the second state.

Referring to FIG. 14A, an electronic device 1400 may include a first housing 310 and a second housing 320. By adjusting a position of connecting members (e.g., the connecting member 580 of FIG. 6) connecting the first plate 501 of the first housing 310 and the second plate 502 of the second housing 320, the radiation volume of the antenna may be adjusted in the overlapping area in the second state.

According to an embodiment of the disclosure, the electronic device 1400 may include a connecting member 580 disposed at each of first positions 1410*a* and 1410*b* in the first state. The connecting member 580 may be disposed between the first plate 501 and the second plate 502. When the second housing 320 moves to the second state, the connecting member 580 may be located in each of second positions 1420*a* and 1420*b*.

According to an embodiment of the disclosure, the electronic device 1400 may have a first radiation area 1401*a* by a connecting member 580 disposed at each of the second positions 1420*a* and 1420*b* in the second state. The first radiation area 1401*a* may be an area capable of radiating electromagnetic waves to the outside when the electronic device is in the second state and an overlapping space of the first plate 501 and the second plate 502 is used as an antenna radiator.

Referring to FIG. 14B, the electronic device 1400 may include a connecting member 580 disposed at each of third positions 1430*a* and 1430*b* in the first state. The connecting member 580 may be disposed between the first plate 501 and the second plate 502. When the second housing 320 moves to the second state, the connecting member 580 may be located in each of fourth positions 1440*a* and 1440*b*.

According to an embodiment of the disclosure, the electronic device 1400 may have a second radiation area 1401*b* by the connecting member 580 disposed at each of the fourth positions 1440*a* and 1440*b* in the second state.

Referring to FIGS. 14A and 14B, the second radiation area 1401*b* may have a wider radiation volume than the first radiation area 1401*a*. According to an embodiment of the disclosure, when the electronic device 1400 is in the second state, a resonance frequency generated by the first radiation area 1401*a* having a narrower radiation volume than the second radiation area 1401*b* may be higher. The electronic device 1400 may adjust a position of the connecting member 580 in order to adjust the radiation volume.

According to the above-described embodiment of the disclosure, the electronic devices 1200, 1300, and 1400 may adjust the resonance frequency of the overlapping area by adjusting a position of the slit, the overlapping area between the first plate 501 and the second plate 502, or the position of the connecting member 580. Through the adjusted resonant frequency, the electronic devices 1200, 1300, and 1400 may provide an antenna having a constant frequency despite a change in the state of the electronic device.

Figure 15:
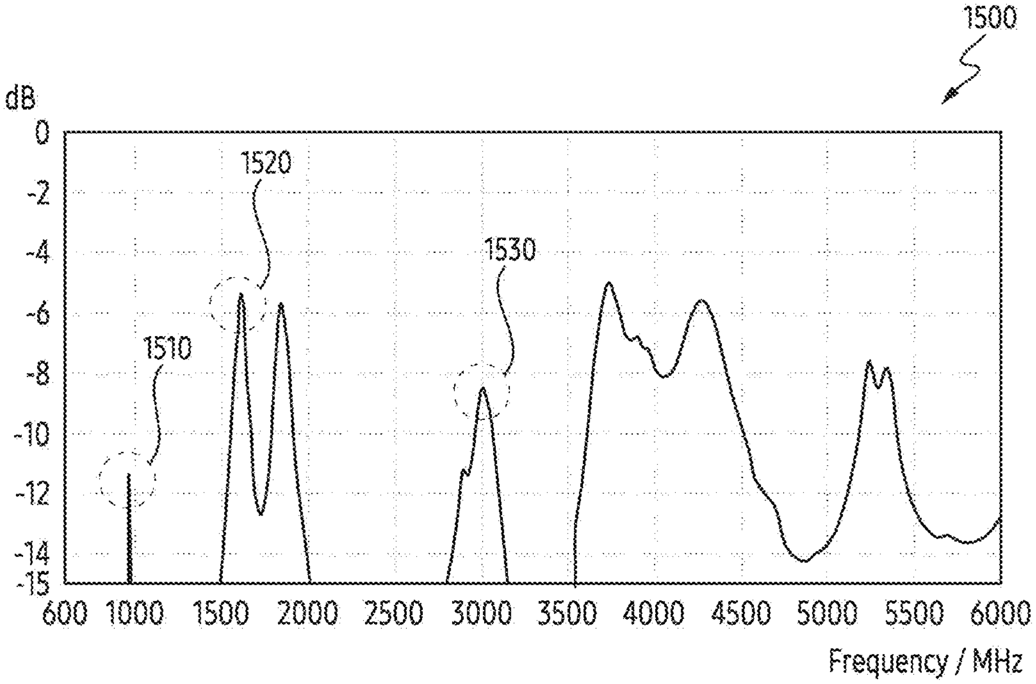
FIGS. 15, 16, and 17 are graphs illustrating adjusting of a resonance frequency of an antenna of an electronic device, according to various embodiments of the disclosure.
Figure 16:
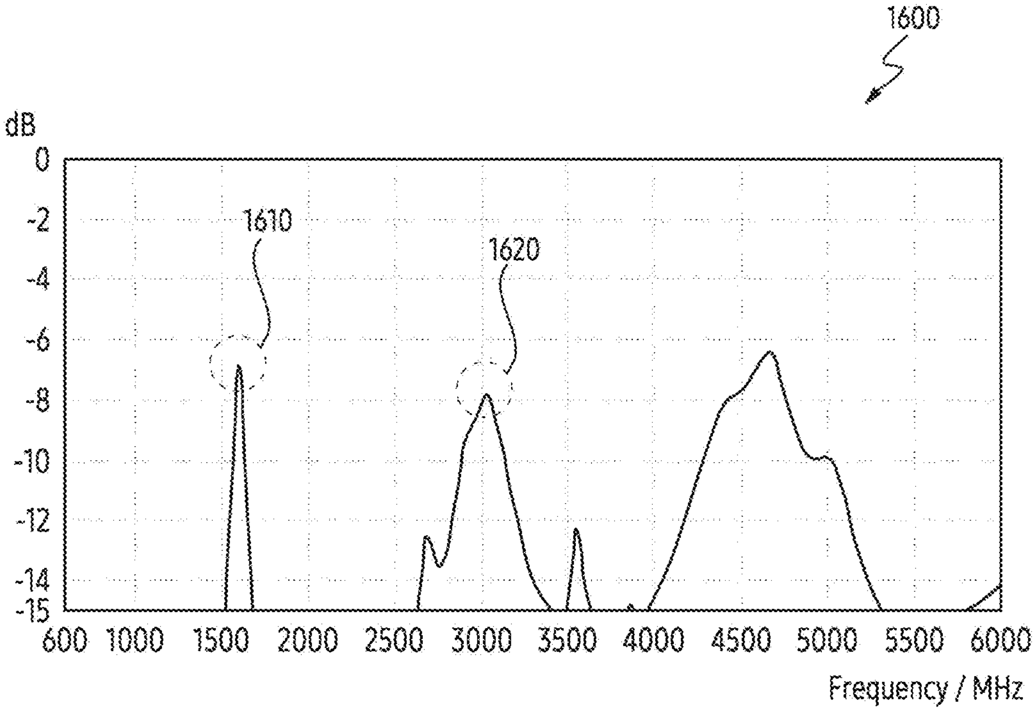
Figure 17:
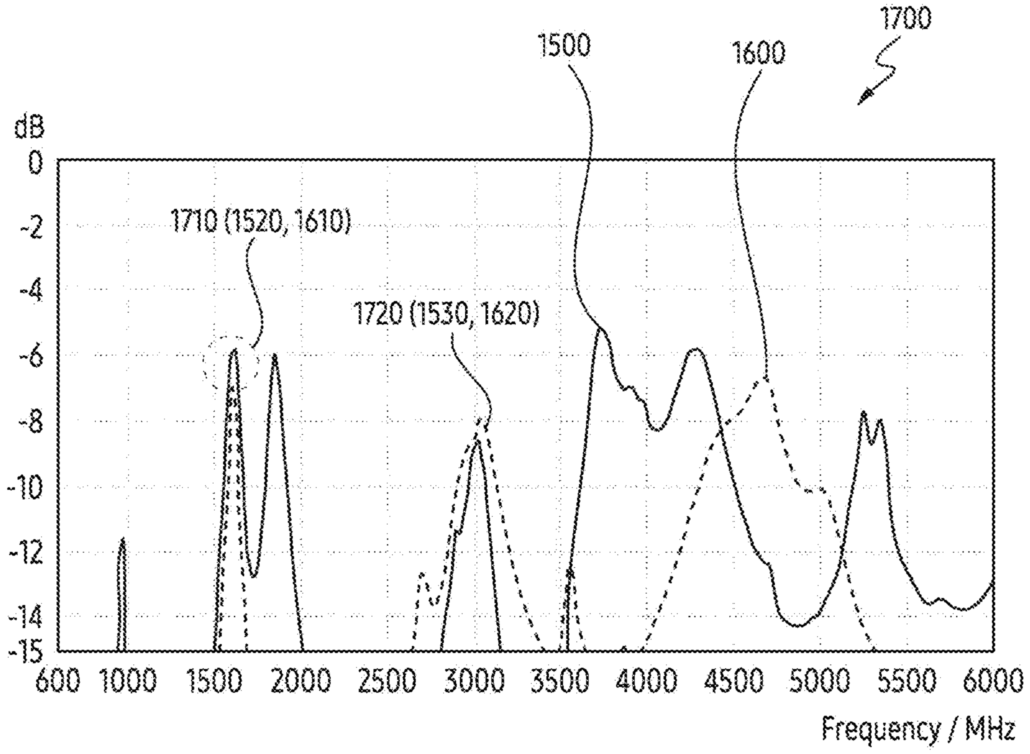

FIGS. 15, 16, and 17 are graphs illustrating adjusting of a resonance frequency of an antenna of an electronic device according to various embodiments of the disclosure.

Referring to FIGS. 15, 16, and 17, they illustrate adjusting of a frequency of the electronic device in the second state.

The electronic device (e.g., the electronic device 300 of FIG. 5A) may adjust a resonance frequency by adjusting an overlapping area of a first plate (e.g., the first plate 501 of FIG. 5A) and a second plate (e.g., the second plate 502 of FIG. 5A). For another example, the electronic device 300 may adjust a resonance frequency by adjusting a position of a slit (e.g., the slit 520 of FIG. 5A) for power supply. For still another example, the electronic device 300 may adjust a resonance frequency by adjusting a position of a connecting member (e.g., the connecting member 580 of FIG. 6) disposed between the first plate 501 and the second plate 502.

A graph 1500 of FIG. 15 illustrates a gain when an area in which the first plate 501 and the second plate 502 overlap in the first state operates as an antenna. Referring to the graph 1500, in the first state, an area in which the first plate 501 and the second plate 502 overlap may include a first resonance frequency 1510, a second resonance frequency 1520, and a third resonance frequency 1530.

The graph 1600 of FIG. 16 illustrates a gain when an area in which the first plate 501 and the second plate 502 overlap in the second state operates as an antenna. Referring to the graph 1600, in the second state, an area in which the first plate 501 and the second plate 502 overlap may include a fourth resonance frequency 1610 and a fifth resonance frequency 1620.

According to an embodiment of the disclosure, the first plate 501 and the second plate 502 disposed to overlap may be a cavity antenna that operates through interaction. An antenna operated by the interaction between the first plate 501 and the second plate 502 may have a plurality of resonance frequencies. In the overlapping area of the first plate 501 and the second plate 502, a resonance frequency may move according to conversion of the first state and the second state. The first resonance frequency 1510 in the first state may be lower than the fourth resonance frequency 1610 in the second state. In the electronic device, since an overlapping area between the first plate 501 and the second plate 502 in the first state is wider than the second state, the first resonance frequency 1510 in the first state may be lower than the fourth resonance frequency 1610 in the second state.

Referring to FIG. 17, in a graph 1700, the second resonance frequency 1520 in the first state may at least partially overlap the fourth resonance frequency 1610 in the second state. By adjusting a size of the overlapping area between the first plate 501 and the second plate 502, adjusting the position of the slit 520, or adjusting the position of the connecting member 580 between the first plate and the second plate, the second resonance frequency 1520 in the first state may be adjusted to at least partially overlap the fourth resonance frequency 1610 in the second state. For example, the second resonance frequency 1520 in the first state and the fourth resonance frequency 1610 in the second state may be set to approximately 1600 MHz, which is a first target resonance frequency 1710.

According to an embodiment of the disclosure, in the graph 1700, the third resonance frequency 1530 in the first state may at least partially overlap the fifth resonance frequency 1520 in the second state. By adjusting the area of the overlapping area of the first plate 501 and the second plate 502, adjusting the position of the slit 520, or adjusting the position of the connecting member 580 between the first plate 501 and the second plate 502, the third resonance frequency 1530 in the first state may be adjusted to at least partially overlap the fifth resonance frequency 1620 in the second state. For example, the third resonance frequency 1530 in the first state and the fifth resonance frequency 1620 in the second state may be set to approximately 3000 MHz, which is a second target resonance frequency 1720.

According to an embodiment of the disclosure, by adjusting the size of the overlapping area between the first plate 501 and the second plate 502, adjusting the position of the slit 520, or adjusting the position of the connecting member 580 between the first plate 501 and the second plate 502, at least one of the resonance frequencies in the first state and at least one of the resonance frequencies in the second state may be adjusted to overlap. Since the first plate 501 and the second plate 502 operate as an antenna in a band including a resonant frequency overlapping each other regardless of the state of the electronic device 1200, 1300, or 1400, the electronic device 1200, 1300, or 1400 may communicate with an external electronic device in a designated band regardless of the state.

The electronic device according to the above-described embodiment may provide an antenna capable of operating in the same frequency band regardless of the state of the electronic device. The electronic device may provide an antenna without having a separate antenna module, by utilizing the overlapping first plate and the second plate as an antenna. By reducing the number of antenna modules, the electronic device can mount another electronic component in a secured internal space and improve the utilization of the internal space.

According to the above-described embodiment of the disclosure, an electronic device (e.g., the electronic device 300 of FIG. 5A) may comprise a first housing (e.g., the first housing 310 of FIG. 5A) including a first plate (e.g., the first plate 501 of FIG. 5A) including an opening (e.g., the opening 510 of FIG. 5A), a second housing (e.g., the second housing 320 of FIG. 5A) including a second plate (e.g., the second plate 502 of FIG. 5A) spaced apart from the first plate, and coupled to the first housing to be movable along a first direction or a second direction opposite to the first direction with respect to the first housing, and a wireless communication circuit operatively connected to the second plate, the second housing may include an opening formed in the second plate and a slit (e.g., the slit 520 of FIG. 5A) formed along a surface of the second plate from a periphery of the opening, an overlapping area (e.g., the area 550A of FIG. 5A) of the second plate and the first plate, in a first state movable in the first direction among the first direction and the second direction may be wider than an overlapping area (e.g., the area 550B of FIG. 5A) of the second plate and the first plate, in a second state movable in the second direction among the first direction and the second direction, and the wireless communication circuit may communicate with an external electronic device in a designated frequency band through the first plate and the second plate.

According to an embodiment of the disclosure, the second plate may interact with the first plate by a current applied to the first plate.

According to an embodiment of the disclosure, the wireless communication circuit may be mounted on a printed circuit board in the second housing.

According to an embodiment of the disclosure, the electronic device may further include an extension portion (e.g., the extension portion 540 of FIG. 5A) extending along a periphery of the opening formed in the first plate and feeding through an end connected to the slit.

According to an embodiment of the disclosure, the extension portion may include a transmission line electrically connected to the first plate and transmitting a data signal from the wireless communication circuit to the first plate, and a conductive layer electrically connected to the first plate and connected to a ground portion of the electronic device.

According to an embodiment of the disclosure, the transmission line may face the slit at the end.

According to an embodiment of the disclosure, the conductive layer may be segmented in the area corresponding to the slit. The conductive layer may be removed in the area corresponding to the slit.

According to an embodiment of the disclosure, the slit may extend from a periphery facing the first direction and along the first direction.

According to an embodiment of the disclosure, the slit may extend from a periphery perpendicular to the first direction and along a direction perpendicular to the first direction.

According to an embodiment of the disclosure, the electronic device may further comprise a first connecting member disposed between the first plate and the second plate within an area including a second periphery among peripheries perpendicular to a first periphery of the opening in which the slit is formed, and a second connecting member disposed between the first plate and the second plate within an area including a third periphery facing the second periphery.

According to an embodiment of the disclosure, the designated frequency band may be determined based on an electrical path connected from the slit to the first connecting member along the first periphery and the second periphery, in the overlapping area of the first plate and the second plate, in the second state, when the first housing is viewed from above.

According to an embodiment of the disclosure, the designated frequency band may be determined based on an electrical path extending from the slit to the second connecting member along the first periphery and the third periphery, in the overlapping area of the first plate and the second plate, in the first state, when the first housing is viewed from above.

According to an embodiment of the disclosure, the electronic device may further comprise a second printed circuit board (e.g., the second printed circuit board 530 of FIG. 10), on which the wireless communication circuit is disposed, disposed in the second housing, a third printed circuit board (e.g., the third printed circuit board 1010 of FIG. 10) in the first housing, a first flexible printed circuit board (e.g., the first flexible printed circuit board 1020 of FIG. 10) electrically connecting the first printed circuit board and the third printed circuit board, and a second flexible printed circuit board (e.g., the second extension portion 1030) electrically connecting the second printed circuit board and the third printed circuit board.

According to an embodiment of the disclosure, the wireless communication circuit may transmit a data signal to the slit through the first printed circuit board, the first flexible printed circuit board, the third printed circuit board, the second flexible printed circuit board and the second printed circuit board.

According to an embodiment of the disclosure, the first plate and the second plate may have a first resonance frequency in a first frequency band and a second resonance frequency in a second frequency band higher than the first frequency band, in the first state.

According to an embodiment of the disclosure, the first plate and the second plate may have a third resonance frequency in a third frequency band and a fourth resonance frequency in a fourth frequency band higher than the third frequency band, in the second state.

According to an embodiment of the disclosure, the designated frequency band may be a frequency band in which the second frequency band and the third frequency band overlap.

According to an embodiment of the disclosure, the electronic device may further comprise a wireless charging circuit (e.g., the wireless charging circuit 590 of FIG. 5A) on the second plate exposed to the outside of the first housing through the opening, in the first state.

According to an embodiment of the disclosure, an electronic device (e.g., the electronic device 300 of FIG. 5A) may comprise a first housing (e.g., the first housing 310 of FIG. 5A) including a first plate (e.g., the first plate 501 of FIG. 5A) including an opening (e.g., the opening 510 of FIG. 5A), a second housing (e.g., the second housing 320 of FIG. 5A) including a second plate (e.g., the second plate 502 of FIG. 5A) spaced apart from the first plate, and coupled to the first housing to be movable along a first direction or a second direction opposite to the first direction with respect to the first housing, and a wireless communication circuit operatively connected to the second plate. The first housing may include an opening formed in the second plate and a slit (e.g., the slit 520 of FIG. 5A) formed along a surface of the second plate from a position corresponding to a periphery of the opening. An overlapping area of the second plate and the first plate, in a first state movable in the first direction among the first direction and the second direction may be wider than an overlapping area of the second plate and the first plate, in a second state movable in the second direction among the first direction and the second direction.

According to an embodiment of the disclosure, the wireless communication circuit may communicate with an external electronic device in a designated frequency band through the first plate and the second plate.

According to an embodiment of the disclosure, the first plate may be electrically connected to the second plate by power applied to the second plate through the slit.

According to an embodiment of the disclosure, the electronic device may further comprise a wireless charging circuit on the second plate exposed to the outside of the first housing through the opening, in the first state.

According to an embodiment of the disclosure, the wireless communication circuit may be disposed on a printed circuit board in the second housing.

According to an embodiment of the disclosure, the electronic device may further comprise an extension portion in the second housing feeding through an end connected to the slit.

According to an embodiment of the disclosure, the extension portion may include a transmission line electrically connected to the second plate and transmitting a data signal from the wireless communication circuit to the second plate, and a conductive layer electrically connected to the second plate.

According to an embodiment of the disclosure, the transmission line may be exposed toward the slit at the end.

According to an embodiment of the disclosure, the conductive layer is segmented in an area corresponding to the slit.

According to an embodiment of the disclosure, the electronic device may further comprise a first connecting member disposed between the first plate and the second plate within an area including a second periphery among peripheries perpendicular to a first periphery of the opening in which the slit is formed, and a second connecting member disposed between the first plate and the second plate within an area including a third periphery facing the second periphery.

According to an embodiment of the disclosure, in the first state, when a current in the designated frequency band including the second resonance frequency flows to the overlapping area of the first plate and the second plate, a magnetic field distributed in a first area among the overlapping area is greater than a magnetic field distributed in a second area among the overlapping area, and in the overlapping area, the first area is an antenna operating at the second resonance frequency.

According to an embodiment of the disclosure, in the first state, when a current in a band including the fourth resonance frequency flows to the overlapping area, an intensity of the magnetic field distributed in a third area is greater than the intensity of the magnetic field distributed in a fourth area.

According to an embodiment of the disclosure, in the second state, the third area among the overlapping area has an area narrower than that of the fourth area among the overlapping area.

According to an embodiment of the disclosure, since a radiation volume of the fourth area is greater than that of the third area, the third resonance frequency at which the fourth area operates as an antenna is lower than the fourth resonance frequency at which the third area operates as an antenna.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

No claim element is to be construed under the provisions of 35 U.S.C. § 112, sixth paragraph, unless the element is expressly recited using the phrase "means for" or "means.

What is claimed is:

1. An electronic device comprising:

a first housing including a first plate including an opening and a slit formed along a surface of the first plate from a periphery of the opening;

a second housing including a second plate spaced apart from the first plate and at least partially overlapping the opening, and coupled to the first housing to be movable along a first direction or a second direction opposite to the first direction with respect to the first housing;

a wireless communication circuit electrically connected to the second plate; and a first printed circuit board electrically connected to the wireless communication circuit and extending along a periphery of the opening formed in the first plate to feed through an end connected to the slit, wherein the wireless communication circuit is configured to communicate with an external electronic device in a designated frequency band through the first plate and the second plate.

2. The electronic device of claim 1, wherein the second plate is electrically connected to the first plate by a current applied to the first plate through the slit.

3. The electronic device of claim 1, wherein the wireless communication circuit is disposed on another printed circuit board in the second housing.

4. The electronic device of claim 1, wherein, an overlapping area of the second plate and the first plate, in a slide-in state in which the second housing is movable in the first direction among the first direction and the second direction, is wider than an overlapping area of the second plate and the first plate, in a slide out state in which the second housing is movable in the second direction among the first direction and the second direction.

5. The electronic device of claim 1, wherein the first printed circuit board includes:

a transmission line connected to the first plate and transmitting a data signal from the wireless communication circuit to the first plate, and a conductive layer connected to the first plate, wherein when looking at the slit, a portion of the transmission line overlaps the slit, and wherein the conductive layer is spaced apart from an area corresponding to the slit and overlaps the first plate excluding the slit.

6. The electronic device of claim 5, wherein the conductive layer is segmented in the area corresponding to the slit.

7. The electronic device of claim 1, wherein the slit extends from a periphery facing the first direction and along the first direction.

8. The electronic device of claim 1, wherein the slit extends from a periphery perpendicular to the first direction and along a direction perpendicular to the first direction.

9. The electronic device of claim 4, further comprising:

a first connecting member disposed between the first plate and the second plate within an area including a second periphery among peripheries perpendicular to a first periphery of the opening in which the slit is formed; and a second connecting member disposed between the first plate and the second plate within an area including a third periphery facing the second periphery.

10. The electronic device of claim 9, wherein the designated frequency band is determined based on an electrical path extending from the slit to the first connecting member along the first periphery and the second periphery, in the overlapping area of the first plate and the second plate, in a slide out state in which the second housing is movable in the second direction among the first direction and the second direction, when the first housing is viewed from above.

11. The electronic device of claim 10, wherein the designated frequency band is determined based on an electrical path extending from the slit to the second connecting member along the first periphery and the third periphery, in the overlapping area of the first plate and the second plate, in a slide in state in which the second housing is movable in the first direction among the first direction and the second direction, when the first housing is viewed from above.

12. The electronic device of claim 4, further comprising:

a second printed circuit board, on which the wireless communication circuit is disposed, disposed in the second housing;

a third printed circuit board disposed in the first housing;

a first flexible printed circuit board electrically connecting the first printed circuit board and the third printed circuit board; and a second flexible printed circuit board electrically connecting the second printed circuit board and the third printed circuit board, wherein the wireless communication circuit transmits a data signal to the slit through the first printed circuit board, the first flexible printed circuit board, the third printed circuit board, the second flexible printed circuit board and the second printed circuit board.

13. The electronic device of claim 12, wherein the first plate and the second plate have a first resonance frequency in a first frequency band and a second resonance frequency in a second frequency band higher than the first frequency band, in a first state, and wherein the first plate and the second plate have a third resonance frequency in a third frequency band and a fourth resonance frequency in a fourth frequency band higher than the third frequency band, in a second state.

14. The electronic device of claim 13, wherein the designated frequency band is a frequency band in which the second frequency band and the third frequency band overlap.

15. The electronic device of claim 13, further comprising:

a wireless charging circuit on the second plate exposed to an outside of the first housing through the opening, in the first state.

16. An electronic device comprising:

a first housing including a first plate including an opening;

a second housing coupled to the first housing to be moveable in a first direction or a second direction opposite to the first direction with respect to the first housing, the second housing including a second plate spaced apart from the first plate, at least partially overlapping the opening, and a slit formed along a surface of the second plate from a position corresponding to a periphery of the opening;

a wireless communication circuit operatively connected to the first plate; and a printed circuit board including an extension electrically connected to the wireless communication circuit and feeding through an end connected to the slit, wherein the wireless communication circuit communicates with an external electronic device in a designated frequency band through the first plate and the second plate.

17. The electronic device of claim 16, wherein the first plate is electrically connected to the second plate by a current applied to the second plate through the slit.

18. The electronic device of claim 16, further comprising:

a wireless charging circuit on the second plate exposed to outside of the first housing through the opening, in a first state.

19. The electronic device of claim 16, wherein the wireless communication circuit is disposed on a printed circuit board in the second housing.

20. The electronic device of claim 16, wherein, an overlapping area of the second plate and the first plate, in a first state in which the second housing is movable in the first direction among the first direction and the second direction, is wider than an overlapping area of the second plate and the first plate, in a second state in which the second housing is moveable in the second direction among the first direction and the second direction.

* * * * *